United States Patent
Otoshi et al.

(10) Patent No.: US 7,931,947 B2
(45) Date of Patent: Apr. 26, 2011

(54) CELLULOSE ACYLATE FILM, METHOD OF PRODUCING THE SAME, STRETCHED CELLULOSE ACYLATE FILM AND METHOD OF PRODUCING THE SAME

(75) Inventors: Masaaki Otoshi, Fujinomiya (JP); Kiyokazu Hashimoto, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1065 days.

(21) Appl. No.: 11/663,727

(22) PCT Filed: Sep. 21, 2005

(86) PCT No.: PCT/JP2005/017914
§ 371 (c)(1),
(2), (4) Date: Mar. 26, 2007

(87) PCT Pub. No.: WO2006/033459
PCT Pub. Date: Mar. 30, 2006

(65) Prior Publication Data
US 2007/0264446 A1 Nov. 15, 2007

(30) Foreign Application Priority Data
Sep. 24, 2004 (JP) .................................. 2004-278166

(51) Int. Cl.
C09K 19/52 (2006.01)
B29C 47/38 (2006.01)
B32B 23/20 (2006.01)
C08B 3/16 (2006.01)

(52) U.S. Cl. ............ 428/1.6; 428/1.1; 428/532; 349/96; 264/211.11; 528/502 B; 536/65; 536/68; 527/300

(58) Field of Classification Search .................. 526/300; 428/1.1, 532, 1.6; 528/502 B; 264/210.1, 264/211.11; 536/65, 68; 349/96; 527/300
See application file for complete search history.

(56) References Cited

U.S. PATENT DOCUMENTS 6,013,217 A 1/2000 Hauenstein et al.
7,604,852 B2 * 10/2009 Oya .............................. 428/1.2

FOREIGN PATENT DOCUMENTS

| JP | 7-333433 A | 12/1995 |
| JP | 8-231761 A | 9/1996 |
| JP | 9-26572 A | 1/1997 |

(Continued)

OTHER PUBLICATIONS

English language translation of JP 2002-265636A; publication date: Sep. 18, 2002.*

(Continued)

Primary Examiner — Fred M Teskin
(74) Attorney, Agent, or Firm — Sughrue Mion, PLLC

(57) ABSTRACT

An unstretched cellulose acylate film hardly breakable upon stretching can be produced by melt film forming and as a result, a highly oriented stretched cellulose acylate film can be obtained. Using an extruder with a screw compression ratio of 2.5 to 4.5 and an L/D of 20 to 50, a cellulose acylate resin is extruded into a sheet at an extrusion temperature of 190° C. to 240° C. from a die to a cooling drum, and solidified by cooling to prepare an unstretched cellulose acylate film 16, which is then stretched to produce a stretched cellulose acylate film.

18 Claims, 8 Drawing Sheets

FOREIGN PATENT DOCUMENTS

| | | |
|---|---|---|
| JP | 10-48420 | 2/1998 |
| JP | 11-316378 A | 11/1999 |
| JP | 2000-154261 A | 6/2000 |
| JP | 2001-141926 | 5/2001 |
| JP | 2002-265636 A | 9/2002 |
| JP | 2002-311240 A | 10/2002 |
| JP | 2003-215337 A | 7/2003 |
| JP | 2003-315551 A | 11/2003 |
| JP | 2004-12731 A | 1/2004 |
| JP | 2004-54257 A | 2/2004 |

OTHER PUBLICATIONS

Kokaigiho of Japan Inst of Invention & Innovation, Koki 2001-1745, Mar. 15, 2001, pp. 17-22.

* cited by examiner

| | | #1 1-1 | 1-2 | 1-3 | #2 1-1 | 1-2 |
|---|---|---|---|---|---|---|
| SUBSTITUTION DEGREE IN CELLULOSE ACYLATE | ACETATE GROUP (A) | 1.0 | " | " | " | " |
| | PROPIONATE GROUP (B1) | | | | | |
| | BUTYRYL GROUP (B2) | 1.7 | " | " | " | " |
| | PENTANOYL GROUP (B3) | | | | | |
| | HEXANOYL GROUP (B4) | | | | | |
| | TOTAL OF B 1 TO 4 | 1.7 | " | " | " | " |
| | A + B | 2.7 | " | " | " | " |
| MOLECULAR WEIGHT | | #12 | #13 | #14 | #15 | #16 |
| PLASTICIZER KIND | | TPP | " | " | " | " |
| AMOUNT ADDED (wt%) | | 6 | " | " | " | " |
| Tg (°C) | | 105 | " | " | " | " |
| COMPRESSION RATIO L/D OF EXTRUDER | | 32 / 3.5 | " | " | " | " |
| EXTRUSION TEMPERATURE (°C) | | 190 | 220 | 240 | 185 | 245 |
| DSC ENDOTHERMIC PEAK J/g | | 3.2 | 2.5 | 1.2 | 5.4 | 1 |
| FILM FORMING METHOD | | #3 | " | " | " | " |
| #4 #5 | #6 | +10 | " | " | " | " |
| | STRETCHING RATIO | 1.1 | " | " | " | " |
| | #7 | +10 | " | " | " | " |
| | #8 | 1.6 | " | " | " | " |
| #9 | Re (nm) | 40 | 45 | 50 | #10 | 55 |
| | FLUCTUATION (%) | 2 | 3 | 4 | | 2 |
| | Rth (nm) | 260 | 250 | 240 | | 230 |
| | FLUCTUATION (%) | 2 | 4 | 3 | | 2 |
| | HAZE % | 1.5 | 0.8 | 0.3 | 2.3 | 0.2 |
| | YI VALUE | 3 | 5 | 6 | 3 | 11 |
| | THICKNESS (μm) | 100 | 103 | 102 | 99 | 100 |
| | #11 | 70 | 100 | 180 | 47 | 220 |

1 EXAMPLE
2 COMPARATIVE EXAMPLE
3 MELTING
4 STRETCHING METHOD
5 LONGITUDINAL STRETCHING
6 PRE-HEATING TEMPERATURE (RELATIVE TO Tg) (°C)
7 STRETCHING TEMPERATURE (RELATIVE TO Tg) (°C)
8 TRANSVERSE STRETCHING STRETCHING RATIO
9 EVALUATION OF STRETCHED FILM
10 BROKEN, NO FILM OBTAINED
11 ELONGATION AT BREAK UPON STRETCHING
12 30,000
13 40,000
14 60,000
15 20,000
16 100,000
17 70,000

| | | 1-4 | 1-5 | 1-6 | 1-7 | 1-8 |
|---|---|---|---|---|---|---|
| SUBSTITUTION DEGREE IN CELLULOSE ACYLATE | ACETATE GROUP (A) | 1.0 | 〃 | 〃 | 〃 | 〃 |
| | PROPIONATE GROUP (B1) | | | | | |
| | BUTYRYL GROUP (B2) | 1.7 | 〃 | 〃 | 〃 | 〃 |
| | PENTANOYL GROUP (B3) | | | | | |
| | HEXANOYL GROUP (B4) | | | | | |
| | TOTAL OF B 1 TO 4 | 1.7 | 〃 | 〃 | 〃 | 〃 |
| | A + B | 2.7 | 〃 | 〃 | 〃 | 〃 |
| MOLECULAR WEIGHT | | #12 | 〃 | 〃 | 〃 | 〃 |
| PLASTICIZER KIND | | DOA | 〃 | 〃 | 〃 | 〃 |
| AMOUNT ADDED (wt%) | | 8 | 〃 | 〃 | 〃 | 〃 |
| Tg (°C) | | 103 | 〃 | 〃 | 〃 | 〃 |
| COMPRESSION RATIO L/D OF EXTRUDER | | 3.5 32 | 〃 | 〃 | 〃 | 〃 |
| EXTRUSION TEMPERATURE (°C) | | 230 | 〃 | 〃 | 〃 | 〃 |
| DSC ENDOTHERMIC PEAK J/g | | 2.1 | 2 | 2.3 | 1.9 | 1.8 |
| FILM FORMING METHOD | | #3 | 〃 | 〃 | 〃 | 〃 |
| #4 #5 | #6 | −30 | 0 | +50 | −40 | +60 |
| | STRETCHING RATIO | 1.5 | 〃 | 〃 | 〃 | 〃 |
| | #7 | +15 | 〃 | 〃 | 〃 | 〃 |
| | #8 | 3 | 5 | 〃 | 〃 | 〃 |
| #9 | Re (nm) | 100 | 105 | 95 | 110 | 90 |
| | FLUCTUATION (%) | 3 | 3 | 2 | 3 | 2 |
| | Rth (nm) | 480 | 490 | 470 | 485 | 465 |
| | FLUCTUATION (%) | 4 | 2 | 3 | 3 | 2 |
| | HAZE % | 0.6 | 0.5 | 0.7 | 0.9 | 0.3 |
| | YI VALUE | 5 | 4 | 6 | 7 | 5 |
| | THICKNESS (μm) | 280 | 300 | 260 | 240 | 260 |
| | #11 | 230 | 230 | 190 | 200 | 180 |

1 EXAMPLE
2 COMPARATIVE EXAMPLE
3 MELTING
4 STRETCHING METHOD
5 LONGITUDINAL STRETCHING
6 PRE-HEATING TEMPERATURE (RELATIVE TO Tg) (°C)
7 STRETCHING TEMPERATURE (RELATIVE TO Tg) (°C)
8 TRANSVERSE STRETCHING STRETCHING RATIO
9 EVALUATION OF STRETCHED FILM
10 BROKEN, NO FILM OBTAINED
11 ELONGATION AT BREAK UPON STRETCHING
12 30,000
13 40,000
14 60,000
15 20,000
16 100,000
17 70,000

| | | 1-9 | 1-10 | 1-11 | 1-12 | 1-13 |
|---|---|---|---|---|---|---|
| SUBSTITUTION DEGREE IN CELLULOSE ACYLATE | ACETATE GROUP (A) | 1.0 | = | = | = | = |
| | PROPIONATE GROUP (B1) | 1.7 | = | = | = | = |
| | BUTYRYL GROUP (B2) | | | | | |
| | PENTANOYL GROUP (B3) | | | | | |
| | HEXANOYL GROUP (B4) | | | | | |
| | TOTAL OF B 1 TO 4 | 1.7 | = | = | = | = |
| | A + B | 2.7 | = | = | = | = |
| MOLECULAR WEIGHT | | #12 | = | = | = | = |
| PLASTICIZER KIND | | PTP | = | = | = | = |
| AMOUNT ADDED (wt%) | | 10 | = | = | = | = |
| Tg (°C) | | 95 | = | = | = | = |
| COMPRESSION RATIO L/D OF EXTRUDER | | 3.5 / 30 | 2.5 / 32 | 2.5 | 4.5 | 4.5 |
| EXTRUSION TEMPERATURE (°C) | | 230 | = | = | = | = |
| DSC ENDOTHERMIC PEAK J/g | | 1.7 | 1.6 | 1.9 | 2.1 | 2.2 |
| FILM FORMING METHOD | | #3 | = | = | = | = |
| #4 #5 | #6 | 0 | = | = | = | = |
| | STRETCHING RATIO | 2.5 | = | = | = | = |
| | #7 | +1 | = | = | = | = |
| | #8 | 2.5 | = | = | = | = |
| #9 | Re (nm) | 10 | 10 | 8 | 12 | 8 |
| | FLUCTUATION (%) | 3 | 3 | 4 | 4 | 3 |
| | Rth (nm) | 380 | 375 | 370 | 385 | 365 |
| | FLUCTUATION (%) | 3 | 4 | 2 | 1 | 2 |
| | HAZE % | 0.6 | 0.9 | 1.1 | 1.6 | 1.7 |
| | YI VALUE | 3 | 5 | 6 | 6 | 5 |
| | THICKNESS (μm) | 100 | 104 | 108 | 97 | 101 |
| | #11 | 160 | 180 | 180 | 190 | 220 |

1 EXAMPLE
2 COMPARATIVE EXAMPLE
3 MELTING
4 STRETCHING METHOD
5 LONGITUDINAL STRETCHING
6 PRE-HEATING TEMPERATURE (RELATIVE TO Tg) (°C)
7 STRETCHING TEMPERATURE (RELATIVE TO Tg) (°C)
8 TRANSVERSE STRETCHING STRETCHING RATIO
9 EVALUATION OF STRETCHED FILM
10 BROKEN, NO FILM OBTAINED
11 ELONGATION AT BREAK UPON STRETCHING
12 30,000
13 40,000
14 60,000
15 20,000
16 100,000
17 70,000

FIG.3C

| | | 1-14 | 1-15 | 1-16 | 1-17 | 1-18 |
|---|---|---|---|---|---|---|
| SUBSTITUTION DEGREE IN CELLULOSE ACYLATE | ACETATE GROUP (A) | 1.0 | = | = | = | = |
| | PROPIONATE GROUP (B1) | | | | | |
| | BUTYRYL GROUP (B2) | 1.7 | = | = | = | = |
| | PENTANOYL GROUP (B3) | | | | | |
| | HEXANOYL GROUP (B4) | | | | | |
| | TOTAL OF B 1 TO 4 | 1.7 | = | = | = | = |
| | A + B | 2.7 | = | = | = | = |
| | MOLECULAR WEIGHT | #13 | = | = | = | = |
| | PLASTICIZER KIND | TPP | = | = | = | = |
| | AMOUNT ADDED (wt%) | 3 | = | = | = | = |
| | Tg (°C) | 119 | = | = | = | = |
| | COMPRESSION RATIO L/D OF EXTRUDER | 3.5 / 50 | = | = | = | = |
| | EXTRUSION TEMPERATURE (°C) | 230 | 220 | 240 | 190 | 195 |
| | DSC ENDOTHERMIC PEAK J/g | 2.1 | 1.7 | 1.5 | 3.8 | 3.2 |
| | FILM FORMING METHOD | #3 | = | = | = | = |
| #4 #5 | #6 | +20 | = | = | = | = |
| | STRETCHING RATIO | 1.6 | = | = | = | = |
| | #7 | +15 | = | = | = | = |
| | #8 | 1 | = | = | = | = |
| #9 | Re (nm) | 250 | 250 | 250 | 250 | 250 |
| | FLUCTUATION (%) | 3 | 4 | 4 | 4 | 3 |
| | Rth (nm) | 180 | 180 | 180 | 180 | 180 |
| | FLUCTUATION (%) | 3 | 1 | 2 | 3 | 4 |
| | HAZE % | 0.5 | 0.6 | 0.8 | 1.1 | 1.5 |
| | YI VALUE | 7 | 6 | 5 | 8 | 5 |
| | THICKNESS (μm) | 96 | 99 | 100 | 103 | 101 |
| | #11 | 140 | 175 | 120 | 90 | 80 |

FIG.3D

1 EXAMPLE
2 COMPARATIVE EXAMPLE
3 MELTING
4 STRETCHING METHOD
5 LONGITUDINAL STRETCHING
6 PRE-HEATING TEMPERATURE (RELATIVE TO Tg) (°C)
7 STRETCHING TEMPERATURE (RELATIVE TO Tg) (°C)
8 TRANSVERSE STRETCHING STRETCHING RATIO
9 EVALUATION OF STRETCHED FILM
10 BROKEN, NO FILM OBTAINED
11 ELONGATION AT BREAK UPON STRETCHING
12 30,000
13 40,000
14 60,000
15 20,000
16 100,000
17 70,000

| | | 1-19 | 1-20 | 1-21 | 1-22 | 1-23 | 1-24 |
|---|---|---|---|---|---|---|---|
| SUBSTITUTION DEGREE IN CELLULOSE ACYLATE | ACETATE GROUP (A) | 1.2 | 0.4 | 1.2 | 0.2 | 0.0 | 0.5 |
| | PROPIONATE GROUP (B1) | | | | 2.7 | 2.95 | 2.0 |
| | BUTYRYL GROUP (B2) | 1.3 | 2.5 | 1.2 | | | |
| | PENTANOYL GROUP (B3) | | | | | | |
| | HEXANOYL GROUP (B4) | | | | | | |
| | TOTAL OF B 1 TO 4 | 1.3 | 2.5 | 1.2 | 2.7 | 2.95 | 2.0 |
| | A + B | 2.5 | 2.9 | 2.4 | 2.9 | 2.95 | 2.5 |
| | MOLECULAR WEIGHT | #13 | #14 | #15 | #16 | #17 | #12 |
| | PLASTICIZER KIND | — | — | — | — | — | — |
| | AMOUNT ADDED (wt%) | 0 | " | " | " | " | " |
| | Tg (°C) | 145 | 120 | 170 | 135 | 125 | 130 |
| | COMPRESSION RATIO L/D OF EXTRUDER | 3 / 32 | " | " | " | " | 3 / 24 |
| | EXTRUSION TEMPERATURE (°C) | 195 | " | " | " | " | " |
| | DSC ENDOTHERMIC PEAK J/g | 2.5 | 3.1 | 3.2 | 1.6 | 1.9 | 2.4 |
| #4 #5 | FILM FORMING METHOD | #3 | " | " | " | " | " |
| | #6 | −10 | " | " | " | " | " |
| | STRETCHING RATIO | 1.02 | " | " | " | " | " |
| | #7 | +55 | " | " | " | " | " |
| | #8 | 1.1 | " | " | " | " | " |
| #9 | Re (nm) | 10 | 30 | 8 | 45 | 55 | 35 |
| | FLUCTUATION (%) | 2 | 4 | 3 | 3 | 4 | 4 |
| | Rth (nm) | 40 | 50 | 35 | 65 | 75 | 45 |
| | FLUCTUATION (%) | 3 | 2 | 2 | 2 | 1 | 1 |
| | HAZE % | 0.4 | 0.3 | 1.1 | 0.7 | 0.8 | 0.3 |
| | YI VALUE | 3 | 3 | 4 | 4 | 6 | 6 |
| | THICKNESS (μm) | 30 | 40 | 35 | 35 | 40 | 40 |
| | #11 | 60 | 90 | 55 | 130 | 120 | 180 |

1 EXAMPLE
2 COMPARATIVE EXAMPLE
3 MELTING
4 STRETCHING METHOD
5 LONGITUDINAL STRETCHING
6 PRE-HEATING TEMPERATURE (RELATIVE TO Tg) (°C)
7 STRETCHING TEMPERATURE (RELATIVE TO Tg) (°C)
8 TRANSVERSE STRETCHING STRETCHING RATIO
9 EVALUATION OF STRETCHED FILM
10 BROKEN, NO FILM OBTAINED
11 ELONGATION AT BREAK UPON STRETCHING
12 30,000
13 40,000
14 60,000
15 20,000
16 100,000
17 70,000

FIG.3E

| | CELLULOSE ACYLATE | | | | POLYMERIZATION DEGREE | PLASTICIZER | | UNSTRETCHED FILM | | | LAYER STRUCTURE OF POLARIZING PLATE | OTHER PROPERTIES | |
|---|---|---|---|---|---|---|---|---|---|---|---|---|---|
| | DEGREE OF SUBSTITUTION WITH ACETYL (X) | DEGREE OF SUBSTITUTION WITH GROUPS OTHER THAN ACETYL (Y) | SUBSTITUENT OTHER THAN ACETYL | TOTAL SUBSTITUTION DEGREE (X+Y) | | KIND | AMOUNT | THICKNESS (μm) | Re (nm) | Rth (nm) | | COLOR CHANGE IN POLARIZING PLATE* | EVALUATION |
| EXAMPLE 1 | 0.11 | 2.81 | PROPIONYL | 2.92 | 190 | PLASTICIZER 4 | 6.0 | 110 | 3 | 20 | POLARIZING PLATE A | 1 | GOOD |
| EXAMPLE 2 | 0.20 | 2.60 | PROPIONYL | 2.80 | 200 | " | 8.0 | 80 | 0 | 8 | " | 0 | GOOD |
| EXAMPLE 3 | 0.25 | 2.53 | PROPIONYL | 2.78 | 210 | " | 10.0 | 90 | 1 | 16 | POLARIZING PLATE B | 0 | GOOD |
| EXAMPLE 4 | 0.40 | 2.30 | PROPIONYL | 2.70 | 170 | PLASTICIZER 3 | 6.0 | 110 | 5 | 30 | " | 1 | GOOD |
| EXAMPLE 5 | 0.70 | 1.90 | PROPIONYL | 2.60 | 185 | " | 9.0 | 95 | 8 | 42 | POLARIZING PLATE A | 2 | GOOD |
| EXAMPLE 6 | 1.10 | 1.40 | PROPIONYL | 2.50 | 195 | " | 12.0 | 125 | 8 | 58 | " | 2 | GOOD |
| EXAMPLE 7 | 1.18 | 1.05 | PROPIONYL | 2.85 | 160 | PLASTICIZER 1 | 6.0 | 85 | 10 | 60 | " | 6 | MODERATE |
| EXAMPLE 8 | 0.05 | 2.90 | PROPIONYL | 2.95 | 170 | NONE | 0.0 | 75 | 6 | 28 | " | 2 | GOOD |
| EXAMPLE 9 | 0.20 | 2.00 | PROPIONYL | 2.20 | 140 | PLASTICIZER 2 | 12.0 | 75 | 3 | 41 | POLARIZING PLATE B | 1 | GOOD |
| EXAMPLE 10 | 0.10 | 1.95 | PROPIONYL | 2.05 | 150 | PLASTICIZER 4 | 20.0 | 140 | 2 | 18 | " | 3 | GOOD |
| EXAMPLE 11 | 0.20 | 2.60 | BUTYRYL GROUP | 2.80 | 200 | " | 8.0 | 80 | 9 | 59 | POLARIZING PLATE A | 4 | MODERATE |
| EXAMPLE 12 | 1.10 | 1.72 | BUTYRYL GROUP | 2.82 | 180 | " | 6.0 | 85 | 8 | 55 | " | 5 | MODERATE |
| COMPARATIVE EXAMPLE 1 | 1.95 | 0.90 | BUTYRYL GROUP | 2.85 | 160 | " | 6.0 | 85 | 14 | 75 | " | 10 | POOR |
| COMPARATIVE EXAMPLE 2 | 2.10 | 0.75 | BUTYRYL GROUP | 2.85 | 160 | " | 6.0 | 85 | 16 | 77 | " | 10 | POOR |

COLOR CHANGE IN POLARIZING PLATE*: EVALUATED ON A SCALE OF ONE TO TEN (THE LARGER THE NUMBER, THE GREATER THE COLOR CHANGE)

PLASTICIZER 1: BIPHENYLDIPHENYL PHOSPHATE
PLASTICIZER 2: DIOCTYL ADIPATE
PLASTICIZER 3: GLYCEROL DIACETATE MONOOLEATE
PLASTICIZER 4: POLYETHYLENE GLYCOL (MOLECULAR WEIGHT 600)

FIG.4

CELLULOSE ACYLATE FILM, METHOD OF PRODUCING THE SAME, STRETCHED CELLULOSE ACYLATE FILM AND METHOD OF PRODUCING THE SAME

TECHNICAL FIELD

The present invention relates to a cellulose acylate film, a method of producing the same, a stretched cellulose acylate film and a method of producing the same, and particularly to a technique for producing an unstretched cellulose acylate film by melt film forming for producing a stretched cellulose acylate film having qualities suitable for a liquid crystal display device.

BACKGROUND ART

Conventionally, cellulose acylate films have been stretched to generate in-plane retardation (Re) and retardation in the thickness direction (Rth), and it has been practiced to extend viewing angles by using such film as a retardation film in a liquid crystal display device.

Examples of methods of stretching a cellulose acylate film include a method of stretching in the longitudinal (length) direction (longitudinal stretching), a method of stretching in the transverse (width) direction (transverse stretching), and a method of carrying out longitudinal stretching and transverse stretching simultaneously (simultaneous biaxial stretching). Of these, because of the compactness of the equipment, longitudinal stretching has been employed in many cases so far. Generally, in the longitudinal stretching, a film is heated to the glass transition temperature (Tg) or higher on at least two pairs of nip rolls, and stretched in the longitudinal direction with setting the carrying rate of the nip roll on the exit side faster than that of the nip roll on the entrance side.

Patent Document 1 describes a method of longitudinal stretching of cellulose ester. In Patent Document 1, by carrying out longitudinal stretching in the direction opposite to the direction of casting film, angle irregularities of the lagging axis is improved. Patent Document 2 describes a method of stretching in which nip rolls positioned with a small span of a length/width ratio (L/W) of 0.3 or more and 2 or less are provided in the stretching zone. According to Patent Document 2, the orientation in the thickness direction (Rth) can be improved. The length/width ratio described herein means a value obtained by dividing the distance (L) between the nip rolls used for stretching by the width (W) of a cellulose acylate film to be stretched.

[Patent Document 1] Japanese Patent Application Laid-Open No. 2002-311240

[Patent Document 2] Japanese Patent Application Laid-Open No. 2003-315551

However, when stretched cellulose acylate films produced by the methods described in Patent Documents 1 and 2 are used as a retardation film for a liquid crystal display device, minute display irregularities may be generated, and the films are not of satisfactory quality as a retardation film for a liquid crystal display device.

Conventional cellulose acylate films produced by melt film forming have a defect that they tend to be broken upon stretching when the stretching ratio is increased, and when they are used as a retardation film, the stretching ratio cannot be increased to the level sufficient for achieving the desired in-plane retardation (Re) and retardation in the thickness direction (Rth), and therefore a highly oriented stretched cellulose acylate film cannot be obtained.

The present invention has been made in view of such circumstances and aims at providing a cellulose acylate film from which a highly oriented stretched cellulose acylate film can be obtained by producing an unstretched cellulose acylate film hardly breakable upon stretching by melt film forming, a method of producing the same, a stretched cellulose acylate film and a method of producing the same.

DISCLOSURE OF THE INVENTION

To achieve the aforementioned object, the method of producing a cellulose acylate film of the first aspect of the present invention is a method of producing a cellulose acylate film by melt film forming, comprising the steps of: extruding a cellulose acylate resin into a sheet at an extrusion temperature of 190° C. to 240° C. on a cooling support through a die using an extruder which has a screw compression ratio of 2.5 to 4.5 and an L/D of 20 to 50, and solidifying the sheet by cooling.

When producing a cellulose acylate film by a melt film forming method, the produced cellulose acylate film tend to be yellowed, and therefore it has been commonly practiced to lower the extrusion temperature of the extruder. However, the present inventors have conducted intensive studies on the extrusion condition for improving breaking upon stretching which is the problem to be solved described above, and have found that too low an extrusion temperature causes fine crystal to remain in the cellulose acylate film, which crystal is an obstacle to stretching, and film breaking thus easily occurs when the produced cellulose acylate film is stretched. Further, it has been also found that in order not to leave fine crystal in the cellulose acylate film after production, setting the screw compression ratio and the L/D of the extruder to appropriate levels is also important. The present invention has been made in view of these findings.

According to the first aspect, since a cellulose acylate resin is extruded into a sheet at an extrusion temperature (extruder exit temperature) of 190° C. to 240° C. on a cooling support through a die using an extruder which has a screw compression ratio of 2.5 to 4.5 and an L/D of 20 to 50, and solidified by cooling, a cellulose acylate film difficult to be yellowed and less likely to cause breaking upon stretching can be produced. As used herein, simple reference to "cellulose acylate film" means an unstretched cellulose acylate film, while the cellulose acylate film after stretching is referred to as "stretched cellulose acylate film". Further, the screw compression ratio means a ratio of volume in the supply unit to that in the measurement unit in an extruder, and the L/D is a ratio of the cylinder bore diameter (D) to the cylinder length (L).

To achieve the aforementioned object, the cellulose acylate film of the second aspect of the present invention has an elongation at break of 50% or more when the film is monoaxially stretched at a glass transition temperature Tg+10° C.

The second aspect defines the elongation at break of a cellulose acylate film suitable for a functional film such as a retardation film in a liquid crystal display device, and it is necessary that the elongation at break is 50% or more when the film is monoaxially stretched at a glass transition temperature Tg+10° C.

In this regard, an elongation at break of 50% or more means that stretching is successful 50% up or more before the film is broken based on the original size before stretching, which in other words means 1.5 times or more when the value before stretching is defined as 1.

The cellulose acylate film with an elongation at break of 50% or more can be produced by the method of the first aspect. Regarding the method of measuring elongation at break, a tensile machine equipped with a heater, e.g., "Heated Tensilon" made by Toyo Seiki Co., Ltd. is used, and after pre-heating a film sample in an oven heated to Tg+10° C. of the sample for 1 minute, the elongation at break (difference before and after stretching) is measured under conditions of a chuck distance of 100 mm and a tensile speed of 100 mm/minute.

The cellulose acylate film of the third aspect of the present invention is a film according to the second aspect, the film having a haze of 2.0% or less, an yellowness index (YI value) of 10 or less and an endothermic peak value of 4.0 J/g or less, which peak appears in the region of the glass transition temperature Tg or higher in DSC (differential scanning calorimetry).

The third aspect defines properties of the cellulose acylate film other than the aforementioned elongation at break which are suitable for a functional film such as a retardation film in a liquid crystal display device, and it is necessary that the film has a haze of 2.0% or less, an yellowness index (YI value) of 10 or less and an endothermic peak value of 4.0 J/g or less, which peak appears in the region of the glass transition temperature Tg or higher in DSC (differential scanning calorimetry).

The cellulose acylate film with such optical properties can be produced by the method of the first aspect.

The cellulose acylate film of the fourth aspect of the present invention is a film according to the second or third aspect, wherein the acylate group satisfies the following degree of substitution $$2.5 \leq A+B \leq 3.0 \text{ and}$$

$$1.25 \leq B \leq 3.0$$

wherein A represents the degree of substitution with an acetyl group and B represents the total degree of substitution with a propionyl group, a butyryl group, a pentanoyl group and a hexanoyl group.

Cellulose acylate films satisfying this substitution degree have characteristics such as low melting point, being easily stretched and excellent in moisture proof properties, and when they are combined with the aforementioned properties, a stretched cellulose acylate film excellent for a functional film such as a retardation film in a liquid crystal display device can be obtained.

The cellulose acylate film of the fifth aspect of the present invention is a film according to any one of the second to fourth aspects, the film having a molecular weight of 20,000 to 100,000. When the molecular weight is more than 100,000, the melt viscosity is increased and the extrusion temperature is thus increased, making it easier to cause yellowing due to thermal degradation. When the molecular weight is less than 20,000, mechanical strength when formed into a film is reduced.

To achieve the aforementioned object, the method of producing a stretched cellulose acylate film of the sixth aspect of the present invention comprises the step of stretching the unstretched cellulose acylate film produced according to the first aspect in at least one of the longitudinal direction and the transverse direction of the film at 1 to 2.5 times.

The sixth aspect is a method of producing a stretched cellulose acylate film, comprising the step of stretching the cellulose acylate film produced by the method of the first aspect. By using the cellulose acylate film of the present invention, stretching at 1 to 2.5 times becomes possible. Accordingly, a stretched cellulose acylate film excellent for a functional film such as a retardation film in a liquid crystal display device can be obtained.

To achieve the aforementioned object, the stretched cellulose acylate film of the seventh aspect of the present invention is obtained by stretching the unstretched cellulose acylate film according to any one of the second to the fifth aspect in at least one of the longitudinal direction and the transverse direction of the film at 1 to 2.5 times.

Regarding the stretched cellulose acylate film of the seventh aspect, by stretching the cellulose acylate film with the properties of any of the second to fifth aspect, stretching at 1 to 2.5 times becomes possible. Accordingly, a stretched cellulose acylate film excellent for a functional film such as a retardation film in a liquid crystal display device can be obtained.

The cellulose acylate film of the eighth aspect of the present invention is a film according to the seventh aspect, the film a thickness of 30 to 300 µm, an in-plane retardation (Re) of 0 to 500 nm and a retardation in the thickness direction (Rth) of 30 to 500 nm.

Regarding the cellulose acylate film of the eighth aspect, by stretching in at least one of the longitudinal direction and the transverse direction of the film at 1 to 2.5 times, a stretched cellulose acylate film suitable for a functional film such as a retardation film in a liquid crystal display device, which has a thickness of 30 to 300 µm, an in-plane retardation (Re) of 0 to 500 nm and a retardation in the thickness direction (Rth) of 30 to 500 nm is obtained.

The cellulose acylate film of the ninth aspect of the present invention is a film according to the eighth aspect, wherein the fluctuation in the Re and the fluctuation in the Rth are 5% or less in both the width direction and the length direction.

Regarding the cellulose acylate film of the ninth aspect, by stretching the cellulose acylate film with the properties of any of the second to fifth aspect, the fluctuation in the Re and the fluctuation in the Rth can be decreased to as small as 5% or less in both the width direction and the length direction.

The tenth aspect of the present invention is a polarizing plate comprising at least one layer of the unstretched cellulose acylate film according to any one of the first to fifth aspects stacked. The eleventh aspect is a compensation film for a liquid crystal display panel, comprising the unstretched cellulose acylate film according to any one of the first to fifth aspects as a substrate thereof. The twelfth aspect is an anti-reflection film comprising the unstretched cellulose acylate film according to any one of the first to the fifth aspects as a substrate thereof.

The thirteenth aspect of the present invention is a polarizing plate comprising at least one layer of the stretched cellulose acylate film according to any one of the seventh to ninth aspects stacked. The fourteenth aspect is a compensation film for a liquid crystal display panel, comprising the stretched cellulose acylate film according to any one of the seventh to ninth aspects as a substrate thereof. The fifteenth aspect is an anti-reflection film comprising the stretched cellulose acylate film according to any one of the seventh to ninth aspects as a substrate thereof.

According to the present invention, by producing an unstretched cellulose acylate film hardly breakable upon stretching the film, a highly oriented stretched cellulose acylate film can be obtained.

As a result, a stretched cellulose acylate film with excellent optical properties can be obtained, and therefore a functional film such as a retardation film which exhibits high orientation when incorporated into and used in a liquid crystal display device can be obtained.

BRIEF DESCRIPTION OF THE DRAWINGS

FIGS. 3A to 3E are tables describing Examples of the present invention; and

FIG. 4 is a table describing the polarizing plates of Examples of the present invention.

DESCRIPTION OF SYMBOLS

Figure 1:
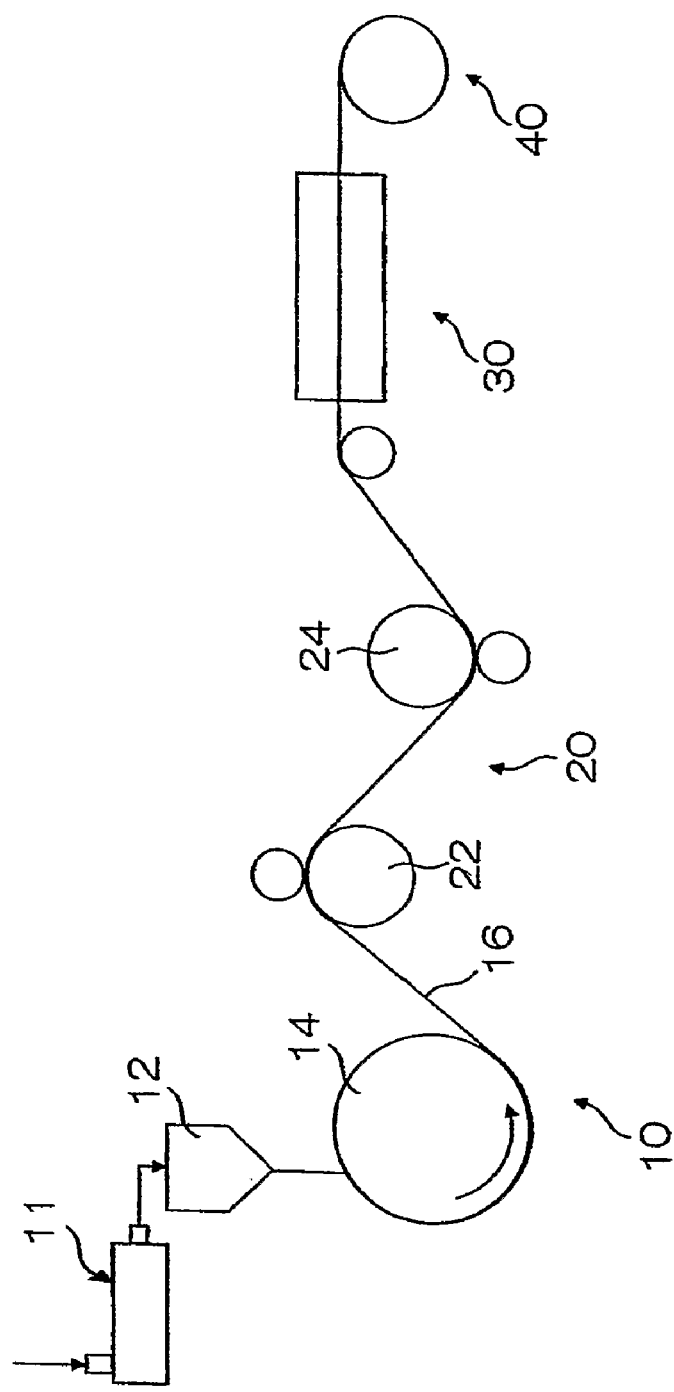
FIG. 1 illustrates the structure of an apparatus for producing a film, to which the present invention is applied.

10 ... film forming part
11 ... extruder
12 ... die
14 ... cooling drum
16 ... cellulose acylate film (unstretched)
20 ... longitudinal stretching part
22, 24 ... nip roll
26 ... cylinder
28 ... screw shaft
30 ... transverse stretching part
31 ... flight
32 ... single screw
34 ... supply port
36 ... discharge port
40 ... take-up part
A ... supply unit of extruder
B ... compression unit of extruder
C ... measurement unit of extruder

BEST MODE FOR CARRYING OUT THE INVENTION

Preferred embodiments of the cellulose acylate film, the method of producing the same, the stretched cellulose acylate film and the method of producing the same of the present invention will now be described with reference to the attached figures.

FIG. 1 schematically illustrates an example of the structure of an apparatus for producing a stretched cellulose acylate film.

As shown in FIG. 1, the apparatus is mainly composed of a film forming part 10 for producing a cellulose acylate film before stretching, a longitudinal stretching part 20 for longitudinal stretching of the unstretched cellulose acylate film produced in the film forming part 10, a transverse stretching part 30 for transverse stretching and take-up part 40.

In the film forming part 10, a cellulose acylate resin melted in the extruder 11 is extruded through a die 12 in the form of a sheet and cast on a rotating cooling drum 14 to produce a rapidly cooled and solidified cellulose acylate film 16. The cellulose acylate film 16 is peeled off from the cooling drum 14, transferred to the longitudinal stretching part 20 and then the transverse stretching part 30 to be stretched, and taken up as a roll in the take-up part 40. By this, a stretched cellulose acylate film is produced.

Figure 2:
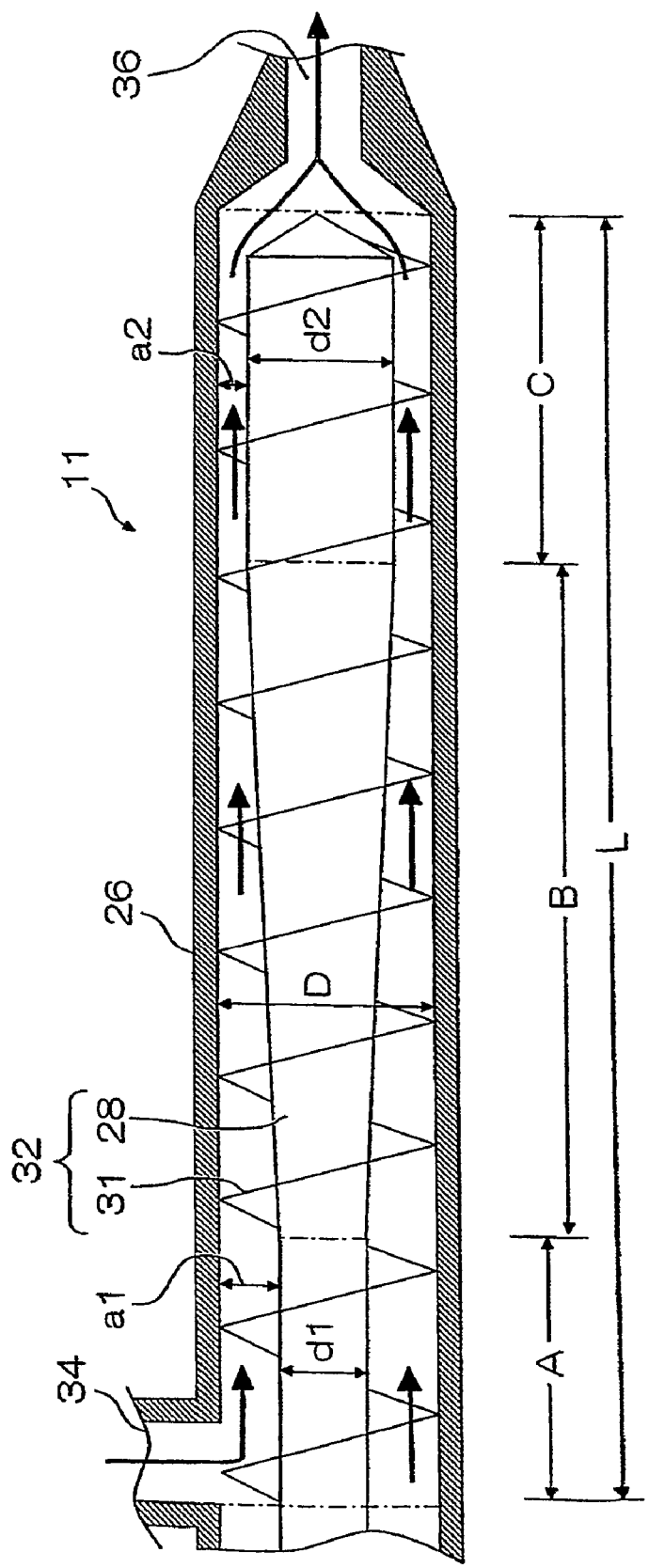
FIG. 2 is a schematic view illustrating the structure of an extruder.

FIG. 2 shows a single screw extruder 11. As shown in FIG. 2, a single screw 32 having a flight 31 on a screw shaft 28 is placed in a cylinder 26. A cellulose acylate resin is supplied from a hopper which is not represented in the figure through a supply port 34 into the cylinder 26. The cylinder 26 is composed of, from the supply port 34 side, a supply unit (region represented by A) for constantly feeding the cellulose acylate resin supplied from the supply port 34, a compression unit (region represented by B) for kneading and compressing the cellulose acylate resin and a measurement unit (region represented by C) for measuring the kneaded and compressed cellulose acylate resin. The cellulose acylate resin melted in the extruder 11 is continuously fed to the die through a discharge port 36.

The screw compression ratio of the extruder 11 is set to 2.5 to 4.5, and the L/D is set to 20 to 50. Herein, the screw compression ratio refers to a ratio of volume in the supply unit to that in the measurement unit, i.e., (the volume per unit length of the supply unit A)÷(the volume per unit length of the measurement unit C), which is calculated using the outer diameter d1 of the screw shaft 28 in the supply unit A, the outer diameter d2 of the screw shaft 28 in the measurement unit C, the groove diameter a1 in the supply unit A and the groove diameter a2 in the measurement unit C. The L/D is a ratio of the cylinder bore diameter (D) to the cylinder length (L). The extrusion temperature is set to 190° C. to 240° C. When the temperature in the extruder 11 is higher than 240° C., a cooling device (unrepresented) may be placed between the extruder 11 and the die 12.

The cellulose acylate resin melted using the extruder 11 as configured above is continuously fed to the die 12 and extruded on the cooling drum 14 in the form of a sheet to be cooled and solidified. By this, an unstretched cellulose acylate film which is to be stretched in the longitudinal stretching part 20 and the transverse stretching part 30 is produced. A cooling band may also be used instead of the cooling drum 14.

According to the method of producing a cellulose acylate film of the present invention, since a cellulose acylate resin is extruded into a sheet at an extrusion temperature of 190° C. to 240° C. on the cooling drum 14 through the die 12 using the extruder 11 which has a screw compression ratio of 2.5 to 4.5 and an L/D of 20 to 50, and cooled and solidified, a cellulose acylate film difficult to be yellowed and less likely to cause breaking upon stretching can be produced. The cellulose acylate film produced according to the method of the present invention can be used as not only a raw material film for producing a stretched cellulose acylate film but also a cellulose acylate film product as is.

In the present invention, the extruder 11 may be a single screw extruder or a twin screw extruder, but when the screw compression ratio is far below 2.5, kneading may be insufficient and some portions remain undissolved, and since heat generation due to shearing is small, melting of crystal may not be sufficient, leaving some minute crystal in the produced cellulose acylate film. In addition, bubbles may be easily incorporated. Thus, when such cellulose acylate film is stretched, remaining crystal hinders stretching, making it impossible to increase orientation to a sufficient degree. On the other hand, when the screw compression ratio is far above 4.5, the resin receives extremely high shearing stress and is thus easily degraded by heat, and the produced cellulose acylate film is therefore easily yellowed. Further, such extremely high shearing stress causes breaking of molecules and the molecular weight is thus decreased, whereby the mechanical strength of the film is lowered. Accordingly, in order to suppress yellowing and prevent breaking upon stretching of the produced cellulose acylate film, the screw compression ratio is in the range of preferably 2.5 to 4.5, more preferably 2.8 to 4.2, particularly preferably 3.0 to 4.0.

Further, when the L/D is far below 20, melting and kneading may be insufficient, and minute crystal may remain in the produced cellulose acylate film as in the case of low compression ratios. On the other hand, when the L/D is far above 50, the detention time of the cellulose acylate resin in the extruder 11 is too long, and the resin may be easily degraded. Such long detention time also causes breaking of molecules and the molecular weight is thus decreased, whereby the mechanical strength of the film is lowered. Accordingly, in order to suppress yellowing and prevent breaking upon stretching of the produced cellulose acylate film, the L/D is in the range of 20 to 50, preferably 22 to 45, particularly preferably 24 to 40.

When the extrusion temperature is far below 190° C., melting of crystal may be insufficient and minute crystal tends to remain in the produced cellulose acylate film. When such cellulose acylate film is stretched, remaining crystal hinders stretching, making it impossible to increase orientation to a sufficient degree. When the extrusion temperature is much higher than 240° C., the cellulose acylate resin is degraded and the degree of yellowing (YI value) is increased. Accordingly, in order to suppress yellowing and prevent breaking upon stretching of the produced cellulose acylate film, the extrusion temperature is in the range of 190° C. to 240° C., preferably 195° C. to 235° C., particularly preferably 200° C. to 230° C.

The cellulose acylate film of the present invention formed using the extruder 11 in which the extrusion conditions are set as described above has an excellent stretching property of an elongation at break of 50% or more (1.5 times or more the value before stretching) when monoaxially stretched at a glass transition temperature Tg+10° C., and characteristic values of a haze of 2.0% or less, an yellowness index (YI value) of 10 or less, and an endothermic peak value of 4.0 J/g or less, which peak appears in the region of the glass transition temperature Tg or higher in DSC (differential scanning calorimetry).

As used herein, the haze is an index of whether the extrusion temperature is too low or not, in other words, an index of the amount of crystal remaining in the produced cellulose acylate film. When the haze is more than 2.0%, a greater amount of minute crystal remain in the produced cellulose acylate film and the cellulose acylate film may be thus easily broken upon stretching. The yellowness index (YI value) is an index of whether the extrusion temperature is too high or not, and when the yellowness index (YI value) is 10 or less, yellowness is not a problem. The endothermic peak which appears in the region of the glass transition temperature Tg or higher in DSC (differential scanning calorimetry) is, as the haze is, an index of whether the extrusion temperature is too low or not. When the endothermic peak value is more than 4.0 J/g, a greater amount of minute crystal remain in the produced cellulose acylate film and the cellulose acylate film may be thus easily broken upon stretching.

The cellulose acylate film with such stretching property and characteristic values is then stretched in the longitudinal stretching part 20 and the transverse stretching part 30.

In the following, the stretching steps for producing a stretched cellulose acylate film by stretching the cellulose acylate film prepared in the film forming part 10 are described.

The cellulose acylate film 16 is stretched in order to orientate molecules in the cellulose acylate film 16 for generating in-plane retardation (Re) and retardation in the thickness direction (Rth). Herein, the retardations Re and Rth are calculated by the following formulas.

$$Re(nm) = |n(MD) - n(TD)| \times T(nm)$$

$$Rth(nm) = |\{(n(MD) + n(TD))/2\} - n(TH)| \times T(nm)$$

In the formula, n(MD), n(TD) and n(TH) are the refractive indexes in the length direction, width direction and thickness direction, and T is thickness in nm.

As shown in FIG. 1, the cellulose acylate film 16 is first longitudinally stretched in the length direction in the longitudinal stretching part 20. In the longitudinal stretching part 20, after the cellulose acylate film 16 is pre-heated, the heated cellulose acylate film 16 is put around the two nip rolls 22,24. The nip roll 24 on the exit side carries the cellulose acylate film 16 at a faster speed than that of the nip roll 22 on the entrance side, and by this, the cellulose acylate film 16 is stretched in the longitudinal direction.

The pre-heating temperature in the longitudinal stretching part 20 is preferably Tg−40° C. to Tg+60° C., more preferably Tg−20° C. to Tg+40° C., further preferably Tg to Tg+30° C. The stretching temperature in the longitudinal stretching part 20 is preferably Tg to Tg+60° C., more preferably Tg+2° C. to Tg+40° C., further preferably Tg+5° C. to Tg+30° C. The stretching ratio in the longitudinal direction is preferably 1.01 to 3 times, more preferably 1.05 to 2.5 times, further preferably 1.1 to 2 times.

The cellulose acylate film 16 stretched in the longitudinal direction is transferred to the transverse stretching part 30 and transversely stretched in the width direction. In the transverse stretching part 30, a tenter is preferably used, in which both ends in the width direction of the cellulose acylate film 16 are held by clips and the film is stretched in the transverse direction. This transverse stretching yields a greater retardation Rth.

The transverse stretching is preferably carried out using a tenter. The stretching temperature is preferably Tg to Tg+60° C., more preferably Tg+2° C. to Tg+40° C., further preferably Tg+4° C. to Tg+30° C. The stretching ratio is preferably 1.01 to 3 times, more preferably 1.05 to 2.5 times, further preferably 1.1 to 2 times. After the transverse stretching, relaxation may be carried out in either or both the longitudinal direction and the transverse direction. This allows the angle distribution of the lagging axis in the width direction to be narrowed.

As a result of such stretching, Re is preferably 0 to 500 nm, more preferably 10 to 400 nm, further preferably 15 to 300 nm. Rth is 30 to 500 nm, more preferably 50 to 400 nm, further preferably 70 to 350 nm.

Of these, those satisfying Re≦Rth are preferred, and those satisfying (Re×2)≦Rth are more preferred. To achieve such high Rth and low Re, it is preferable to stretch a film which has been stretched in the longitudinal (length) direction in the transverse (width) direction as described above. In other words, while the difference in orientations in the longitudinal direction and the transverse direction corresponds to in-plane retardation (Re), the difference in orientations in the longitudinal and the transverse directions can be made smaller and the in-plane orientation (Re) can be thus made smaller by stretching, in addition to the longitudinal direction, in the transverse direction which is perpendicular thereto. On the other hand, because the area ratio is increased by stretching in the transverse direction in addition to the longitudinal direction, the orientation in the thickness direction is increased along with decrease in the thickness, and the Rth can be increased.

Local fluctuation in Re and that in Rth in both the width direction and the length direction are preferably 5% or less, more preferably 4% or less, further preferably 3% or less.

As described above, according to this embodiment, by producing a stretched cellulose acylate film by using a cellulose acylate film produced by the method of the present invention, film breaking upon stretching is hardly caused, and high stretching ratio can be achieved and local fluctuation in the Re and that in the Rth in the width direction and the length direction can be reduced. Accordingly, a stretched cellulose acylate film with excellent optical properties can be produced.

Cellulose acylate resins, the method of forming unstretched cellulose acylate film and the method of processing the cellulose acylate film suitable for the present invention will now be described in detail based on the procedures.

(Cellulose Acylate Resin)

The cellulose acylate used in the present invention preferably has the following characteristics.

A cellulose acylate film in which the acylate group satisfies the following degree of substitution:

$2.5 \leq A+B < 3.0$ and $1.25 \leq B < 3$ (A: degree of substitution with an acetyl group, B: the total degree of substitution with a propionyl group, a butyryl group, a pentanoyl group and a hexanoyl group).

A more preferable substitution degree is, when at least ½ of B is a propionyl group, $2.6 \leq A+B \leq 2.95$ $2.0 \leq B \leq 2.95$ and when less than ½ of B is a propionyl group, $2.6 \leq A+B \leq 2.95$ $1.3 \leq B \leq 2.5$.

A further preferable substitution degree is, when at least ½ of B is a propionyl group, $2.7 \leq A+B \leq 2.95$ $2.4 \leq B \leq 2.9$ and when less than ½ of B is a propionyl group, $2.7 \leq A+B \leq 2.95$ $1.3 \leq B \leq 2.0$.

A feature of the present invention is that the degree of substitution with an acetyl group among the acyl groups is set to be low while the total degree of substitution with a propionyl group, a butyryl group, a pentanoyl group and a hexanoyl group is set to be high. By this, the variation in the Re and the Rth with time after stretching can be made smaller. This is because by increasing the amount of the groups longer than acetyl group, flexibility of the film is increased and the stretching property can be higher, and orientation of cellulose acylate molecules are not easily disturbed by stretching, and the variation in the exhibited Re and Rth with time is thus decreased. However, making acyl groups longer than those described above causes a significant decrease in the glass transition temperature (Tg) and the elastic modulus, and is thus not preferable. For this reason, a propionyl group, a butyryl group, a pentanoyl group and a hexanoyl group which are larger than an acetyl group is preferable, and a propionyl group and a butyryl group are more preferable, and a butyryl group is further preferable.

Basic principles of the method of synthesizing such cellulose acylate are described in Migita et al, Mokuzai Kagaku, p. 180 to 190 (published from Kyoritsu Shuppan Co., Ltd., 1968). A typical synthetic method is liquid-phase acetylation using carboxylic acid anhydride/acetic acid/a sulfuric acid catalyst. Specifically, after subjecting a cellulose raw material such as cotton linter or wood pulp to a pre-treatment with an appropriate amount of acetic acid, the material is poured into a previously cooled carboxylic acid mixture to be esterified, whereby a complete cellulose acylate is synthesized (the total of the acyl substitution degrees at the 2-, 3- and 6-positions being about 3.00). The carboxylic acid mixture described above generally contains acetic acid as a solvent, carboxylic acid anhydride as an esterification agent and sulfuric acid as a catalyst. Carboxylic acid anhydride is usually used in a stoichiometrically excessive amount over the total amount of cellulose which reacts with the anhydride and water present in the system. After completion of the acylation reaction, an aqueous solution of a neutralizing agent (e.g., carbonate, acetate or oxide of calcium, magnesium, iron, aluminum or zinc) is added thereto in order to hydrolyze excessive carboxylic acid anhydride remaining in the system and neutralize part of the esterifying catalyst remaining in the system. The obtained complete cellulose acylate is then kept at 50 to 90° C. in the presence of a small amount of an acetizing reaction catalyst, which is generally remaining sulfuric acid, thus saponified and ripened to be converted to cellulose acylate having a desired acyl substitution degree and polymerization degree. When the desired cellulose acylate is obtained, by completely neutralizing the catalyst remaining in the system with a neutralizing agent as described above, or without such neutralization, the cellulose acylate solution is poured into water or dilute sulfuric acid (or water or dilute sulfuric acid is poured into the cellulose acylate solution) to separate the cellulose acylate, followed by washing and stabilizing treatment to yield cellulose acylate.

The polymerization degree of cellulose acylate preferably used in the present invention is, in a viscosity average polymerization degree, 200 to 700, preferably 250 to 550, more preferably 250 to 400, particularly preferably 250 to 350. The viscosity average polymerization degree can be measured by a limiting viscosity method by Uda et al., (Kazuo Uda, Hideo Saito, Journal of the Society of Fiber Science and Technology, Japan, vol. 18, No. 1, 105-120, 1962). The method is described in detail in Japanese Patent Application Laid-Open No. 9-95538.

The viscosity average polymerization degree can also be adjusted by removing low molecular weight components. When such low molecular weight components are removed, the average molecular weight (polymerization degree) is increased, but the viscosity effectively becomes lower than that of ordinary cellulose acylate. Low molecular weight components can be removed by washing cellulose acylate with an appropriate organic solvent. The molecular weight can also be adjusted by polymerization. For example, when producing cellulose acylate containing small amounts of low molecular weight components, the amount of the sulfuric acid catalyst in the acetizing reaction is preferably adjusted to 0.5 to 25 parts by mass based on 100 parts by mass of cellulose. By setting the amount of the sulfuric acid catalyst to this range, cellulose acylate having a preferable molecular weight distribution (uniform molecular weight distribution) can be synthesized.

As for the cellulose acylate used in the present invention, those having a weight average molecular weight Mw/number average molecular weight Mn ratio of preferably 1.5 to 5.5, more preferably 2.0 to 5.0, particularly preferably 2.5 to 5.0, most preferably 3.0 to 5.0 are used.

These cellulose acylates may be used alone or in a mixture of two or more. A mixture in which a high molecular component other than cellulose acylate is accordingly mixed may also be used. As the high molecular component to be mixed, those highly compatible with cellulose ester are preferred, and the transparency when formed into a film is preferably not less than 80%, more preferably not less than 90%, and further preferably not less than 92%.

In the present invention, by adding a plasticizer to cellulose acylate, the crystalline melting temperature (Tm) of cellulose acylate can be lowered. The molecular weight of the plasticizer used in the present invention is not particularly limited, and the plasticizer may be low molecular weight or high molecular weight. Examples of such plasticizer include phosphoric esters, alkyl phthalyl alkyl glycolates, carboxylic acid esters and polyol fatty acid esters. The plasticizer may be solid or oily substance. That is, the melting point and the boiling point of the plasticizer are not particularly limited. When melt film forming is carried out, a nonvolatile plasticizer is particularly preferably used.

Specific examples of phosphoric esters include triphenyl phosphate, tributyl phosphate, tributoxyethyl phosphate, tricresyl phosphate, trioctyl phosphate, trinaphthyl phosphate, trixylyl phosphate, tris-o-biphenyl phosphate, cresyl phenyl phosphate, octyl diphenyl phosphate, biphenyl diphenyl phosphate and 1,4-phenylene-tetraphenyl phosphate. In addition, phosphoric ester plasticizers described in claims 3 to 7 of National Publication of International Patent Application No. 6-501040 may be used.

Examples of alkyl phthalyl alkyl glycolates include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Examples of carboxylic acid esters include phthalic acid esters such as dimethyl phthalate, diethyl phthalate, dibutyl phthalate, dioctyl phthalate and diethylhexyl phthalate, citric acid esters such as acetyl trimethyl citrate, acetyl triethyl citrate, acetyl tributyl citrate, adipic acid esters such as dimethyl adipate, dibutyl adipate, diisobutyl adipate, bis(2-ethylhexyl)adipate, diisodecyl adipate and bis(butyl diglycol)adipate, aromatic polyvalent carboxylic acid esters such as tetraoctyl pyromellitate and trioctyl trimellitate, aliphatic polyvalent carboxylic acid esters such as dibutyl adipate, dioctyl adipate, dibutyl sebacate, dioctyl sebacate, diethyl azelate, dibutyl azelate and dioctyl azelate, polyol fatty acid esters such as glycerol triacetate, diglycerol tetraacetate, acetylated glyceride, monoglyceride and diglyceride. In addition, butyl oleate, methylacetyl ricinoleate, dibutyl sebacate or triacetin may be used alone or in combination.

Additional examples of such plasticizer include high molecular weight plasticizers such as aliphatic polyesters composed of glycol and dibasic acid such as polyethylene adipate, polybutylene adipate, polyethylene succinate and polybutylene succinate, aliphatic polyesters composed of oxycarboxylic acid such as polylactic acid and polyglycolic acid, aliphatic polyesters composed of lactone such as polycaprolactone, polypropiolactone and polyvalerolactone, and vinyl polymers such as polyvinylpyrrolidone. These plasticizers may be used alone or together with a low molecular weight plasticizer.

Polyol plasticizers are compatible with cellulose fatty acid ester and exhibit significant thermoplasticity-imparting effect, examples of which include glycerol ester compounds such as glycerol ester and diglycerol ester, polyalkylene glycols such as polyethylene glycol and polypropylene glycol and compounds in which an acyl group is bonded to a hydroxyl group of polyalkylene glycol.

Specific examples of glycerol esters include, but are not limited to, glycerol diacetate stearate, glycerol diacetate palmitate, glycerol diacetate myristate, glycerol diacetate laurate, glycerol diacetate caprate, glycerol diacetate nonanoate, glycerol diacetate octanoate, glycerol diacetate heptanoate, glycerol diacetate hexanoate, glycerol diacetate pentanoate, glycerol diacetate oleate, glycerol acetate dicaprate, glycerol acetate dinonanoate, glycerol acetate dioctanoate, glycerol acetate diheptanoate, glycerol acetate dicaproate, glycerol acetate divalerate, glycerol acetate dibutylate, glycerol dipropionate caprate, glycerol dipropionate laurate, glycerol dipropionate myristate, glycerol dipropionate palmitate, glycerol dipropionate stearate, glycerol dipropionate oleate, glycerol tributylate, glycerol tripentanoate, glycerol monopalmitate, glycerol monostearate, glycerol distearate, glycerol propionate laurate and glycerol oleate propionate. These can be used alone or in combination.

Of these, glycerol diacetate caprylate, glycerol diacetate pelargonate, glycerol diacetate caprate, glycerol diacetate laurate, glycerol diacetate myristate, glycerol diacetate palmitate, glycerol diacetate stearate and glycerol diacetate oleate are preferred.

Specific examples of diglycerol esters include, but are not limited to, mixed acid esters of diglycerol such as diglycerol tetraacetate, diglycerol tetrapropionate, diglycerol tetrabutyrate, diglycerol tetravalerate, diglycerol tetrahexanoate, diglycerol tetraheptanoate, diglycerol tetracaprylate, diglycerol tetrapelargonate, diglycerol tetracaprate, diglycerol tetralaurate, diglycerol tetramyristate, diglycerol tetrapamitate, diglycerol triacetate propionate, diglycerol triacetate butyrate, diglycerol triacetate valerate, diglycerol triacetate hexanoate, diglycerol triacetate heptanoate, diglycerol triacetate caprylate, diglycerol triacetate pelargonate, diglycerol triacetate caprate, diglycerol triacetate laurate, diglycerol triacetate myristate, diglycerol triacetate palmitate, diglycerol triacetate stearate, diglycerol triacetate oleate, diglycerol diacetate dipropionate, diglycerol diacetate dibutyrate, diglycerol diacetate divalerate, diglycerol diacetate dihexanoate, diglycerol diacetate diheptanoate, diglycerol diacetate dicaprylate, diglycerol diacetate dipelargonate, diglycerol diacetate dicaprate, diglycerol diacetate dilaurate, diglycerol diacetate dimyristate, diglycerol diacetate dipalmitate, diglycerol diacetate distearate, diglycerol diacetate dioleate, diglycerol acetate tripropionate, diglycerol acetate tributyrate, diglycerol acetate trivalerate, diglycerol acetate trihexanoate, diglycerol acetate triheptanoate, diglycerol acetate tricaprylate, diglycerol acetate tripelargonate, diglycerol acetate tricaprate, diglycerol acetate trilaurate, diglycerol acetate trimyristate, diglycerol acetate tripalmitate, diglycerol acetate tristearate, diglycerol acetate trioleate, diglycerol laurate, diglycerol stearate, diglycerol caprylate, diglycerol myristate and diglycerol oleate. These can be used alone or in combination.

Of these, diglycerol tetraacetate, diglycerol tetrapropionate, diglycerol tetrabutyrate, diglycerol tetracaprylate and diglycerol tetralaurate are preferred.

Specific examples of polyalkylene glycol include, but are not limited to, polyethylene glycol and polypropylene glycol having an average molecular weight of 200 to 1000, and these may be used alone or in combination.

Specific examples of compounds in which an acyl group is bonded to a hydroxyl group of polyalkylene glycol include, but are not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanoate, polyoxyethylene caprate, polyoxyethylene laurate, polyoxyethylene myristate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanoate, polyoxypropylene caprate, polyoxypropylene laurate, polyoxypropylene myristate, polyoxypropylene palmitate, polyoxypropylene stearate, polyoxypropylene oleate and polyoxypropylene linoleate. These may be used alone or in combination.

The amount to be added of plasticizer is 0 to 20% by weight, more preferably 2 to 18% by weight, most preferably 4 to 15% by weight. When the content of the plasticizer is higher than 20% by weight, although the thermal flowability of cellulose acylate is improved, the plasticizer may bleed on the surface of the film formed by melting and the glass transition temperature Tg, which indicates heat resistance, may be decreased.

Further, where necessary, a stabilizer for preventing thermal degradation or coloring may be added to the cellulose acylate used in the present invention within the limit in which the required properties are not damaged.

As a stabilizer, a phosphite compound, a phosphorous acid ester compound, phosphate, thiophosphate, weak organic acid or an epoxy compound may be added alone, or a mixture of two or more of these may be added. As specific examples of phosphite stabilizers, the compounds described in paragraphs [0023] to [0039] of Japanese Patent Application Laid-Open No. 2004-182979 may be preferably used. As specific examples of phosphorous acid ester compounds, the compounds described in Japanese Patent Application Laid-Open Nos. 51-70316, 10-306175, 57-78431, 54-157159 and 55-13765 may be used.

The amount to be added of the stabilizer in the present invention is 0.005 to 0.5% by weight, more preferably 0.01 to 0.4% by weight or more, further preferably 0.05 to 0.3% by weight based on cellulose acylate. When the amount is less than 0.005% by weight, the effect of preventing degradation and coloring in the melt film forming process is insufficient, and this range is thus not preferable. When the amount is more than 0.5%, the stabilizer may bleed on the surface of the cellulose acylate film formed by melting, and this range is thus not preferable.

In addition, an antidegradant and an antioxidant may be added. When a phenol compound, a thioether compound or a phosphorus compound is added as an antidegradant or an antioxidant, synergistic anti-degradation and anti-oxidant effect can be obtained. As other stabilizers, materials described in detail in "Kokai Giho of Japan Institute of Invention & Innovation" (Kogi No. 2001-1745, published Mar. 15, 2001, Japan Institute of Invention & Innovation), pp. 17-22 may be preferably used.

The cellulose acylate used in the present invention may contain an ultraviolet protective agent, and one or more ultraviolet absorbers may be added. As an ultraviolet absorber for liquid crystal, preferred are those with excellent ability to absorb ultraviolet rays having a wavelength of 380 nm or less from the viewpoint of preventing degradation of liquid crystal, and which absorb little visible light having a wavelength of 400 nm or more from the viewpoint of display properties of liquid crystal. Examples thereof include oxybenzophenone compounds, benzotr-iazole compounds, salicylic ester compounds, benzophenone compounds, cyanoacrylate compounds and nickel complex salt compounds. Particularly preferred ultraviolet absorbers are benzotriazole compounds and benzophenone compounds. Of these, benzotriazole compounds are preferred because unwanted coloring of cellulose ester, e.g., cellulose acylate, is small.

Preferred ultraviolet absorbers include 2,6-di-tert-butyl-p-cresol, pentaerythrityl-tetrakis[3-(3,5-di-tert-butyl-4-hydroxyphenyl)propionate], triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], octadecyl-3-(3, 5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene and tris-(3,5-di-tert-butyl-4-hydroxybenzyl)-isocyanurate.

In addition, 2,6-di-tert-butyl-p-cresol, pentaerythrityl-tetrakis[3-(3,5-di-tert-butyl-4-hydroxyphenyl)propionate] and triethylene glycol-bis[3-(3-tert-butyl-5-methyl-4-hydroxyphenyl)propionate] are preferred. Further, a hydrazine metal deactivator such as N,N'-bis[3-(3,5-di-tert-butyl-4-hydroxyphenyl)propionyl]hydrazine or a phosphorus processing stabilizer such as tris(2,4-di-tert-butylphenyl)phosphite may be used together. The amount to be added of these compounds is preferably 1 ppm to 3.0% by mass, more preferably 10 ppm to 2% by mass based on cellulose ester, e.g., cellulose acylate.

As such ultraviolet absorbers, the following commercially available products may be used.

Examples of benzotriazole ultraviolet absorbers include TINUBIN P (Ciba Specialty Chemicals K.K.), TINUBIN 234 (Ciba Specialty Chemicals K.K.), TINUBIN 320 (Ciba Specialty Chemicals K.K.), TINUBIN 326 (Ciba Specialty Chemicals K.K.), TINUBIN 327 (Ciba Specialty Chemicals K.K.), TINUBIN 328 (Ciba Specialty Chemicals K.K.) and Sumisorb 340 (Sumitomo Chemical Co., Ltd.). Examples of benzophenone ultraviolet absorbers include Seesorb 100 (SHIPRO KASEI KAISHA LTD.), Seesorb 101 (SHIPRO KASEI KAISHA LTD.), Seesorb 101S (SHIPRO KASEI KAISHA LTD.), Seesorb 102 (SHIPRO KASEI KAISHA LTD.), Seesorb 103 (SHIPRO KASEI KAISHA LTD.), ADK STAB LA51 (ASAHI DENKA CO., LTD.), Chemisorp 111 (CHEMIPRO KASEI KAISHA LTD.) and UVINUL D-49 (BASF). Examples of oxalic acid anilide ultraviolet absorbers include TINUBIN 312 (Ciba Specialty Chemicals K.K.) and TINUBIN 315 (Ciba Specialty Chemicals K.K.). In addition, as salicylic acid ultraviolet absorbers, Seesorb 201 (SHIPRO KASEI KAISHA LTD.) and Seesorb 202 (SHIPRO KASEI KAISHA LTD.) are commercially available, and examples of cyanoacrylate ultraviolet absorbers include Seesorb 501 (SHIPRO KASEI KAISHA LTD.) and UVINUL N-539 (BASF).

In the present invention, the unstretched cellulose acylate film and the stretched cellulose acylate film preferably have the following Re and Rth.

That is, the unstretched cellulose acylate film of the present invention preferably satisfies the Re and the Rth of the following formulas:

$$0 \leq Re \leq 20$$

$$0 \leq Rth \leq 80,$$

more preferably $$0 \leq Re \leq 15$$

$$0 \leq Rth \leq 70,$$

and further preferably $$0 \leq Re \leq 10$$

$$0 \leq Rth \leq 60.$$

The stretched cellulose acylate film of the present invention preferably satisfies the Re and the Rth of the following formulas:

$0 \leq Re \leq 500$ $30 \leq Rth \leq 500$, more preferably $10 \leq Re \leq 400$ $50 \leq Rth \leq 400$, and further preferably $15 \leq Re \leq 300$ $70 \leq Rth \leq 350$.

(Melt Film Forming)
(1) Drying

Although cellulose acylate resin may be used in the form of powder, it is more preferable to use pelletized resin in order to reduce thickness variation of the formed film.

After adjusting the moisture content of the cellulose acylate resin to 1% or less, more preferably 0.5% or less, further preferably 0.1% or less, the resin is introduced into the hopper of an extruder. At this time, the temperature of the hopper is set to Tg−50° C. to Tg+30° C., more preferably Tg−40° C. to Tg+10° C., further preferably Tg−30° C. to Tg. This prevents moisture readsorption in the hopper, and efficiency of the aforementioned drying can be thus easily achieved. In addition, dehydrated air or inert gas (e.g., nitrogen) may be introduced into the hopper.

(2) Kneading and Extrusion

Kneading is carried out to melt the resin at 190° C. to 240° C., more preferably 195° C. to 235° C., further preferably 200° C. to 230° C. At this stage, the melting temperature may be constant or controlled with dividing into some sections. The kneading time is preferably 2 to 60 minutes, more preferably 3 to 40 minutes, further preferably 4 to 30 minutes. Further, kneading may be carried out in the extruder under inert current (nitrogen, etc.), or with evacuating using an extruder equipped with a vent.

(3) Casting

The molten cellulose acylate resin is passed through a gear pump to remove the pulsation from the extruder 11, filtrated with a metal mesh filter, and extruded through a T-shaped die 12 attached behind the filter on a cooling drum 14 in the form of a sheet. The resin may be extruded in a single layer or in multiple layers using a multimanifold die or a feed block die. At this time, by adjusting the lip interval of the die 12, thickness irregularity in the width direction can be controlled.

The resin is then extruded on the cooling drum 14. At this stage, using an electrostatic application method, an air knife method, an air chamber method, a vacuum nozzle method or a touch roll method, adhesion between the cooling drum 14 and the melt-extruded sheet may be increased. All or part (e.g., both ends only) of the melt-extruded sheet may be subjected to such adhesion improvement treatment.

The temperature of the cooling drum 14 is preferably 60° C. to 160° C., more preferably 70° C. to 150° C., further preferably 80° C. to 140° C. The sheet is then peeled off from the cooling drum 14 and taken up past nip rolls 22,24 and a tenter. The take-up rate is preferably 10 to 100 m/minute, more preferably 15 to 80 m/minute, further preferably 20 to 70 m/minute.

The width of the formed film is 1 to 5 m, more preferably 1.2 to 4 m, further preferably 1.3 m to 3 m. The unstretched cellulose acylate film thus obtained has a thickness of preferably 30 μm to 400 μm, more preferably 40 μm to 300 μm, further preferably 50 μm to 200 μm.

It is preferable that both ends of the cellulose acylate film 16 thus obtained are trimmed and once taken up on a take-up unit 40. Pieces produced after trimming are crushed or subjected to granulation, depolymerization or repolymerization according to need to be reused as a cellulose acylate film material of the same kind or different kind. In addition, applying a laminate film on at least one surface before take up is preferred in view of preventing scars.

The thus obtained cellulose acylate film has a glass transition temperature (Tg) of preferably 70° C. to 180° C., more preferably 80° C. to 160° C., further preferably 90° C. to 150° C.

(Processing of Cellulose Acylate Film)

The cellulose acylate film formed by the aforementioned method is monoaxially or biaxially stretched according to the aforementioned method to produce a stretched cellulose acylate film. This film may be used alone or in combination with a polarizing plate, or a liquid crystal layer, a layer having controlled refractive index (low-reflection layer) or a hard coat layer may be formed thereon. These configurations can be achieved according to the following methods.

(1) Surface Treatment

By subjecting the cellulose acylate film to a surface treatment, adhesion between the film and each functional layer (e.g., an undercoat layer and a back layer) can be improved. For example, a glow discharge treatment, ultraviolet irradiation, a corona treatment, a flame treatment and an acid or alkali treatment may be used. The glow discharge treatment in this case may be cold plasma generated under a low gas pressure of $10^{-3}$ to $10^{-20}$ Torr, or plasma treatment under atmospheric pressure is also preferred. Plasma excitation gas means one which can be excited to be plasma under conditions as described above, and examples thereof include argon, helium, neon, krypton, xenon, nitrogen, carbon dioxide, chlorofluorocarbons such as tetrafluoromethane and a mixture thereof. These details are described in "Kokai Giho of Japan Institute of Invention & Innovation" (Kogi No 2001-1745, published Mar. 15, 2001, Japan Institute of Invention & Innovation), pp. 30-32. In the plasma treatment under atmospheric pressure which is now attracting attention, a radiating energy of 20 to 500 Kgy is used under a condition of 10 to 1000 Kev, and more preferably a radiating energy of 20 to 300 Kgy is used under a condition of 30 to 500 Kev.

Of these treatments, an alkali saponifying treatment is particularly preferred.

In an alkali saponifying treatment, the film may be immersed into a saponifying solution (immersing method), or may be coated with the saponifying solution (coating method). The immersing method can be accomplished by passing the film through a tank containing an aqueous NaOH or KOH solution of a pH of 10 to 14 heated to 20 to 80° C. for 0.1 to 10 minutes, followed by neutralization, water washing and drying.

For the coating method, dip coating, curtain coating, extrusion coating, bar coating and type E coating may be used. As the solvent for the alkali saponifying treatment coating solution, a solvent having excellent wettability appropriate for applying the saponifying solution to a transparent support and capable of maintaining good surface conditions without forming irregularity on the surface of the transparent support is preferably selected. Specifically, alcohol solvents are preferred, and isopropyl alcohol is particularly preferred. In addition, an aqueous surfactant solution may be used as a solvent. As alkali for the alkali saponifying coating solution, those soluble in the aforementioned solvent is preferred, and KOH and NaOH are more preferred. The pH of the saponifying coating solution is preferably not less than 10, more preferably not less than 12. As for the reaction conditions of the alkali saponification, the reaction may be carried out at room temperature for preferably 1 second to 5 minutes, more preferably 5 seconds to 5 minutes, particularly preferably 20 seconds to 3 minutes. After the alkali saponification reaction, the surface coated with the saponifying solution may be washed with water, or with acid and then with water. The saponifying treatment by coating and application of alignment film described later may be continuously carried out so that the number of the steps is reduced. These saponifying methods are specifically described in, for example, Japanese Patent Application Laid-Open No. 2002-82226 and WO 02/46809.

An undercoat layer may also be formed to be adhered to the functional layer. Such undercoat layer may be formed by coating after the aforementioned surface treatment or without any surface treatment. Details of undercoat layer are described in "Kokai Giho of Japan Institute of Invention & Innovation" (Kogi No. 2001-1745, published Mar. 15, 2001, Japan Institute of Invention & Innovation), p. 32.

The surface treatment step and the undercoat step may be included in the last stage of the film forming process, may be independently carried out, or may be during the process of applying functional layers described below.

(Application of Functional Layer)

The cellulose acylate film of the present invention may be used together with functional layers described in "Kokai Giho of Japan Institute of Invention & Innovation" (Kogi No. 2001-1745, published Mar. 15, 2001, Japan Institute of Invention & Innovation), pp. 32 to 45. Particularly preferred is to apply a polarizing layer (polarizing plate), a compensation layer (compensation sheet), or an anti-reflection layer (anti-reflection film).

(A) Application of Polarizing Layer (Preparation of Polarizing Plate)

The protective film for a polarizing film (layer) has a thickness of preferably 25 to 350 μm, more preferably 30 to 200 μm, further preferably 40 to 120 μm. When the cellulose acylate film of the present invention is used as a protective film for a polarizing film, any of the unstretched film or the stretched film may be used. The stretched cellulose acylate film of the present invention may be used as a protective film for a polarizing film, and is preferably used as a retardation compensation film.

The obtained polarizing plate may have the construction as described below:

polarizing plate A: unstretched cellulose acylate film/polarizing film/FUJITAC polarizing plate B: unstretched cellulose acylate film/polarizing film/unstretched cellulose acylate film polarizing plate C: stretched cellulose acylate film/polarizing film/FUJITAC polarizing plate D: stretched cellulose acylate film/polarizing film/unstretched cellulose acylate film polarizing plate E: stretched cellulose acylate film/polarizing film/stretched cellulose acylate film (A-1) Used Materials Commercially available polarizing layers are now generally prepared by immersing stretched polymer into an iodine or dichroic dye solution in a bath, and allowing the iodine or dichroic dye to be impregnated into the binder. As the polarizing film, coating-type polarizing films typically available from Optiva Inc. can also be used. In a polarizing film, iodine or dichroic dye is oriented in the binder to exhibit polarizing characteristics. As dichroic dye, an azo dye, a stilbene dye, a pyrazolone dye, a triphenylmethane dye, a quinoline dye, an oxazine dye, a thiazine dye or an anthraquinone dye may be used. And water-soluble dichroic dyes are preferred. Such dichroic dye preferably contains a hydrophilic substituent (e.g., sulfo, amino or hydroxyl group). Examples thereof include compounds described in "Kokai Giho of Japan Institute of Invention & Innovation" (Kogi No. 2001-1745, published on Mar. 15, 2001), p. 58.

As a binder for the polarizing film, polymers capable of crosslinking by themselves, polymers crosslinked in the presence of a crosslinking agent, or combinations thereof may be used. Examples of binders include methacrylate copolymers, styrene copolymers, polyolefin, polyvinyl alcohol, modified polyvinyl alcohol, poly(N-methylolacrylamide), polyester, polyimide, vinyl acetate copolymers, carboxymethyl cellulose and polycarbonate described in paragraph [0022] of the specification of Japanese Patent Application Laid-Open No. 8-338913. A silane-coupling agent can be used as such polymer. Of these, water-soluble polymers (e.g., poly(N-methylolacrylamide), carboxymethyl cellulose, gelatin, polyvinyl alcohol and modified polyvinyl alcohol) are preferred, gelatin, polyvinyl alcohol and modified polyvinyl alcohol are more preferred, and polyvinyl alcohol and modified polyvinyl alcohol are most preferred. It is particularly preferable to use two kinds of polyvinyl alcohols or modified polyvinyl alcohols of different polymerization degrees. Such polyvinyl alcohol preferably has a saponification degree of preferably 70 to 100%, more preferably 80 to 100%. The polymerization degree of polyvinyl alcohol is preferably 100 to 5,000. Examples of modified polyvinyl alcohol are described in Japanese Patent Application Laid-Open Nos. 8-338913, 9-152509 and 9-316127. Two or more kinds of polyvinyl alcohols and modified polyvinyl alcohols may be used together.

The lower limit of the thickness of the binder is preferably 10 μm. Regarding the upper limit of the thickness, the binder is preferably as thin as possible from the viewpoint of light leakage from the liquid crystal display device. The binder has a thickness of preferably equal to or less than that of currently commercially available polarizing plates (about 30 μm), more preferably 25 μm or less, further preferably 20 μm or less.

The binder for the polarizing film may be crosslinked. A polymer or monomer having a crosslinkable functional group may be mixed with the binder, or a crosslinkable functional group may be directly added to the binder polymer. The binder may be crosslinked by means of light, heat, or pH change, and a binder having a crosslinked structure can be then formed. Crosslinking agents are described in U.S. Pat. Re-issue No. 23,297. In addition, boron compounds (e.g., boric acid and borax) may be used as a crosslinking agent. The amount of the crosslinking agent added to the binder is preferably 0.1 to 20% by mass based on the amount of the binder. In this range, the orientation of the polarizer and the wet heat resistance of the polarizing film are improved.

After completion of the crosslinking reaction, the amount of non-reacted crosslinking agent is preferably not more than 1.0% by mass, more preferably not more than 0.5% by mass. This makes it possible to improve weather resistance.

(A-2) Stretching of Polarizing Layer

A polarizing film is preferably stretched (stretching method) or rubbed (rubbing method), and then dyed with iodine or dichroic dye.

In the stretching method, the stretching ratio of the film is preferably 2.5 to 30.0 times, more preferably 3.0 to 10.0 times. Stretching can be carried out by dry stretching under air or wet stretching with immersing the film in water. The stretching ratio in dry stretching is preferably 2.5 to 5.0 times, and the stretching ratio in the wet stretching is preferably 3.0 to 10.0 times. The film may be stretched in parallel (parallel stretching) or obliquely (oblique stretching) to the machine direction. Stretching may be carried out at one time or several times. By stretching several times, the film can be uniformly stretched even when stretched at high stretching ratios.

a) Parallel Stretching

Before stretching, PVA film is swelled. The swelling degree thereof (the ratio based on the weight of the film before and after swelling) is from 1.2 to 2.0 times. The film is then continuously transferred by guide rolls or the like and stretched in a bath containing an aqueous medium or a dyeing bath containing dissolved dichroic material at a bath temperature of preferably 15° C. to 50° C., more preferably 17° C. to 40° C. Stretching can be carried out with holding the film by two pairs of nip rolls and setting the transferring rate of the rearward nip rolls larger than that of the forward nip rolls. The stretching ratio, which is the ratio of the length after stretching/at the initial stage (hereinafter the same), is preferably 1.2 to 3.5 times, more preferably 1.5 to 3.0 times from the viewpoint of the above-mentioned effects and advantages. The film is then dried at 50 to 90° C. to give a polarizing film.

b) Oblique Stretching

For this stretching, a method of stretching using a tenter projected in an oblique direction described in Japanese Patent Application Laid-Open No. 2002-86554 can be used. Because this stretching is performed under air, the film must be previously hydrated so as to facilitate the stretching. The moisture content is preferably 5% to 100%, more preferably 10% to 100%.

The temperature at the time of stretching is preferably 40° C. to 90° C., more preferably 50° C. to 80° C. The humidity is preferably 50% rh to 100% rh, more preferably 70% rh to 100% rh, further preferably 80% rh to 100% rh. The traveling rate in the longitudinal direction is preferably not less than 1 m/minute, more preferably not less than 3 mm/minute. After completion of the stretching, drying is carried out at preferably 50° C. to 100° C., more preferably 60° C. to 90° C., for preferably 0.5 to 10 minutes, more preferably 1 to 5 minutes.

The absorption axis of the thus-obtained polarizing film is preferably 10 to 90 degrees, more preferably 30 to 60 degrees, further preferably substantially 45 degrees (40 to 50 degrees).

(A-3) Adhesion

The saponified cellulose acylate film and the polarizing layer prepared by stretching are adhered to prepare a polarizing plate. Regarding the direction of adhesion, they are preferably adhered so that the casting axis direction of the cellulose acylate film and the stretching axis direction of the polarizing plate form an angle of 45 degrees.

The adhesive for the adhesion is not particularly limited, and examples thereof include PVA resins (including PVA modified by an acetoacetyl, sulfonic acid, carboxyl or oxyalkylene group) and aqueous solutions of a boron compound. Of these, PVA resins are preferable. The adhesive layer has a thickness of preferably 0.01 to 10 μm, particularly preferably from 0.05 to 5 μm after drying.

The thus-obtained polarizing plate preferably has a higher light transmittance and a higher polarization degree. The light transmittance of the polarizing plate against light having a wavelength of 550 nm is in the range of preferably from 30 to 50%, more preferably from 35 to 50%, most preferably from 40 to 50%. The polarization degree thereof relative to light having a wavelength of 550 nm is in the range of preferably from 90 to 100%, more preferably from 95 to 100%, most preferably from 99 to 100%.

The thus-obtained polarizing plate is stacked with a λ/4 plate to produce circularly polarized light. In this case, they are stacked so that the angle between the retarded phase axis of the λ/4 plate and the absorption axis of the polarizing plate is 45 degrees. The λ/4 plate used here is not particularly limited, but is preferably those having a wavelength dependency such that the lower the wavelength, the smaller the retardation. In addition, a λ/4 plate composed of a polarizing film in which the absorption axis is tilted 20 to 70 degrees in the longitudinal direction and an optically anisotropic layer made of a liquid crystal compound is preferably used.

(B) Application of Compensation Layer (Production of Compensation Sheet)

A compensation layer compensates for a liquid crystal compound in a liquid crystal cell when a liquid crystal display device displays black, and is prepared by forming an alignment film on a cellulose acylate film and applying an optically anisotropic layer thereon.

(B-1) Alignment Film

An alignment film is formed on the aforementioned surface-treated cellulose acylate film. The alignment film has a function of defining the orientation direction of liquid crystal molecules. However, once a liquid crystal compound is oriented and the orientation state is subsequently fixed, the alignment film is no longer an essential constituent of the present invention because the function has been fulfilled. In other words, the polarizing plate of the present invention can also be produced by transferring, to a polarizer, only an optically anisotropic layer with fixed orientation state which is formed on an alignment film.

An alignment film can be formed by means such as rubbing treatment of an organic compound (preferably a polymer), oblique evaporation of an inorganic compound, formation of a layer with microgrooves or accumulation of an organic compound (e.g., ω-tricosanic acid, dioctadecylmethylammonium chloride and methyl stearate) according to the Langmuir-Blodgett method (LB film). In addition, alignment films which attain orientation function by applying an electric field, applying a magnetic field, or by irradiating with light are known.

The alignment film is preferably formed by subjecting a polymer to a rubbing treatment. In principle, the polymer used for an alignment film has a molecular structure capable of orienting liquid crystal molecules.

In the present invention, in addition to the function of orienting liquid crystal molecules, a side chain having a crosslinkable functional group (e.g., a double bond) may be bonded to the main chain, or a crosslinkable functional group capable of orienting liquid crystal molecules may be introduced into the side chain.

Polymers to be used for the alignment film may be polymers capable of crosslinking by themselves, polymers to be crosslinked in the presence of a crosslinking agent, or combinations thereof. Examples of such polymers include methacrylate copolymers, styrene copolymers, polyolefin, polyvinyl alcohol, modified polyvinyl alcohol, poly(N-methylolacrylamide), polyester, polyimide, vinyl acetate copolymers, carboxymethyl cellulose and polycarbonate which are described in paragraph 0022 of the specification of Japanese Patent Application Laid-Open No. 8-338913. A silane-coupling agent can be used as such polymer. Of these, water-soluble polymers (e.g., poly(N-methylolacrylamide), carboxymethyl cellulose, gelatin, polyvinyl alcohol and modified polyvinyl alcohol) are preferred, gelatin, polyvinyl alcohol and modified polyvinyl alcohol are more preferred, and polyvinyl alcohol and modified polyvinyl alcohol are most preferred. It is particularly preferable to use two kinds of polyvinyl alcohols or modified polyvinyl alcohols of different polymerization degrees. Such polyvinyl alcohol has a saponification degree of preferably 70 to 100%, more preferably 80 to 100%. The polymerization degree of the polyvinyl alcohol is preferably 100 to 5,000.

The side chain having function of orienting liquid crystal molecules generally has a hydrophobic group as a functional group. Specific kinds of such functional groups are determined based on the kind and the required orientation state of the liquid crystal molecules. Modifying groups of modified polyvinyl alcohol can be introduced by copolymerization, chain transfer or block polymerization. Examples of modifying groups include hydrophilic groups (carboxylic group, sulfonic group, phosphonic group, amino group, ammonium group, amido group, thiol group), hydrocarbon groups having 10 to 100 carbon atoms, fluorine-substituted hydrocarbon groups, thioether groups, polymerizable groups (unsaturated polymerizable group, epoxy group, aziridinyl group), and alkoxysilyl groups (trialkoxysilyl, dialkoxysilyl, monoalkoxysilyl). Specific examples of such modified polyvinyl alcohols are described in Japanese Patent Application Laid-Open No. 2000-155216, paragraphs 0022 to 0145, and Japanese Patent Application Laid-Open No. 2002-62426, paragraphs 0018 to 0022.

By allowing a side chain having a crosslinkable functional group to be bonded to the main chain of the alignment film polymer, or introducing, into a side chain, a crosslinkable functional group having function of orienting liquid crystal molecules, the alignment film polymer can be copolymerized with polyfunctional monomers contained in the optically anisotropic layer. As a result, not only the polyfunctional monomers themselves, but also the alignment film polymers themselves, and in addition, the polyfunctional monomer and the alignment film polymer, are strongly bonded via a covalent bond. Thus, by introducing a crosslinkable functional group into the alignment film polymer, the strength of the compensation sheet can be significantly improved.

The crosslinkable functional group of the alignment film polymer preferably contains a polymerizable group as the polyfunctional monomer does. Specific examples thereof are described in Japanese Patent Application Laid-Open No. 2000-155216, paragraphs 0080 to 0100. The alignment film polymer may be crosslinked using a crosslinking agent, not only by the aforementioned crosslinkable functional group.

Examples of such a crosslinking agent include aldehyde, N-methylol compounds, dioxane derivatives, compounds that function when the carboxylic group is activated, active vinyl compounds, active halogen compounds, isooxazole and dialdehyde starch. Two or more crosslinking agents may be used in combination. Specific examples thereof include compounds described in Japanese Patent Application Laid-Open No. 2002-62426, paragraphs 0023 to 0024. Highly reactive aldehyde, especially glutaraldehyde, is preferred.

The amount to be added of the crosslinking agent is preferably 0.1 to 20% by mass, more preferably 0.5 to 15% by mass based on the amount of the polymer. The amount of non-reacted crosslinking agent remaining in the alignment film is preferably not more than 1.0% by mass, more preferably not more than 0.5% by mass. By adjusting the amount in this range, sufficient durability can be obtained without causing reticulation even if the alignment film is used in a liquid crystal display device for a long time or left in a high-temperature and high-humidity atmosphere for a long time.

The alignment film can be basically formed by applying a solution containing the aforementioned polymer which is a material for forming the alignment film and a crosslinking agent on a transparent substrate, drying by heating (to be crosslinked) and subjecting to a rubbing treatment. As described above, the crosslinking reaction can be carried out at any stage after applying the solution on the transparent substrate. When a water-soluble polymer such as polyvinyl alcohol is used as a material for forming the alignment film, the coating solution is preferably a mixture of an organic solvent having a defoaming action (e.g., methanol) and water. The ratio of water to methanol is preferably from 0:100 to 99:1, more preferably from 0:100 to 91:9, by mass. This prevents bubbles from being generated and significantly reduces defects in the alignment film and consequently on the surface of the optically anisotropic layer.

As a method of coating the alignment film, spin coating, dip coating, curtain coating, extrusion coating, rod coating and roll coating are preferable, and of these, rod coating is particularly preferable. The film thickness after drying is preferably 0.1 to 10 μm. The drying by heating may be conducted at a temperature of 20° C. to 110° C. To achieve sufficient crosslinking, the drying temperature is preferably from 60° C. to 100° C., particularly preferably from 80° C. to 100° C. The drying time is generally from 1 minute to 36 hours, preferably from 1 to 30 minutes. Further, the pH may be adjusted to an optimal value for the crosslinking agent to be used, and when glutaraldehyde is used as a crosslinking agent, the pH is preferably 4.5 to 5.5, particularly preferably 5.0.

The alignment film is provided on the transparent support or the undercoat layer described above. The alignment film can be obtained by crosslinking the aforementioned polymer layer and then subjecting the surface of the layer to a rubbing treatment.

For the rubbing treatment, methods widely used for orienting liquid crystals of LCD can be applied. More specifically, a method in which the surface of an alignment film is rubbed in a fixed direction using paper, gauze, felt, rubber, nylon or polyester fiber to obtain orientation can be employed. In general, this is carried out by rubbing the film surface several times with a cloth to which fibers of the same length and diameter are uniformly transplanted.

When practicing this production on an industrial scale, the rubbing treatment is carried out by contacting a rotating rubbing roll with a traveling film to which a polarizing layer has been adhered. The circularity, cylindricality and deflection (decentration) of the rubbing roll are all preferably 30 μm or less. The wrap angle of the film relative to the rubbing roll is preferably 0.10 to 90°. However, as described in Japanese Patent Application Laid-Open No. 8-160430, stable rubbing can be achieved by winding the film around the roll at 3600 or more. The traveling speed of the film is 1 to 100 m/minute. Regarding the rubbing angle, an appropriate rubbing angle is selected from the range of 0 to 60°. When the film is used in a liquid crystal display, the rubbing angle is preferably 40 to 50°, particularly preferably 45°.

The alignment film thus obtained has a film thickness of preferably 0.1 to 10 μm.

Liquid crystal molecules in the optically anisotropic layer are then oriented on the alignment film. Subsequently, the alignment film polymer and the multifunctional monomer contained in the optically anisotropic layer are allowed to react or the alignment film polymer is crosslinked using a crosslinking agent according to need.

The liquid crystal molecules used for the optically anisotropic layer include bar-like liquid crystal molecules and disk-like liquid crystal molecules. The bar-like liquid crystal molecule and the disk-like liquid crystal molecule may be a high molecular weight liquid crystal or a low molecular weight liquid crystal, and those in which a low molecular weight liquid crystal has been crosslinked and no liquid crystallinity is thus exhibited may also be included.

(B-2) Bar-Like Liquid Crystal Molecule

As the bar-like liquid crystal molecule, azomethines, azoxy compounds, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolan compounds and alkenylcyclohexyl benzonitriles are preferably used.

The bar-like liquid crystal molecule may be a metal complex. Liquid crystal polymers containing bar-like liquid crystal molecules in the repeat units can also be used as the bar-like liquid crystal molecule. In other words, the bar-like liquid crystal molecule may be bonded to a (liquid crystal) polymer.

Bar-like liquid crystal molecules are described in Chapters 4, 7, and 11 in "Chemistry of Liquid Crystal", Survey of Chemistry, Quarterly, Vol. 22, edited by the Chemical Society of Japan (1994), and Chapter 3 in "Liquid Crystal Device Handbook" edited by the 142 Committee of the Japan Society for the Promotion of Science.

The birefringent index of the bar-like liquid crystal molecules is preferably in the range of 0.001 to 0.7. In order to fix the orientation state, the bar-like liquid crystal molecule may contain a polymerizable group. The polymerizable group is preferably a radically polymerizable unsaturated group or a cationically polymerizable group. Specific examples thereof include polymerizable groups and polymerizable liquid crystal compounds described in Japanese Patent Application Laid-Open No. 2002-62427, paragraphs 0064 to 0086.

(B-3) Disk-Like Liquid Crystal Molecule

Examples of disk-like (discotic) liquid crystal molecule include benzene derivatives described in a study report of C. Destrade et al., Mol. Cryst., vol. 71, p. 111 (1981); truxene derivatives described in a study report of C. Destrade et al., Mol. Cryst., vol. 122, p. 141 (1985) and Phyicslett., A, vol. 78, p. 82 (1990); cyclohexane derivatives described in a study report of B. Kohne et al., Angew. Chem. Soc., vol. 96, p. 70 (1984); and azacrown or phenylacetylene macrocycles described in a study report of J. M. Lehn et al., J. Chem. Commun., p. 1794 (1985) and a study report of J. Zhang et al., J. Am. Chem. Soc. vol. 116, p. 2655 (1994).

As the disk-like liquid crystal molecule, liquid crystal compounds in which a linear alkyl group, alkoxy group or a substituted benzoyloxy group constitutes a side chain, being present as a substituent radially to the parent core located at the center of the molecule are also included. Compounds in which a molecule or a cluster of molecules has rotational symmetry and which can thus give a certain orientation are preferred. Regarding the optically anisotropic layer formed from the disk-like liquid crystal molecule, the compound finally contained in the optically anisotropic layer need not be disk-like liquid crystal molecules, and for example, a compound in which a low molecular weight disk-like liquid crystal molecule containing a group reactive to heat or light is consequently polymerized or crosslinked and thus the molecular weight is increased and the liquid crystallinity is lost may also be included. Preferred examples of disk-like liquid crystal molecules are described in Japanese Patent Application Laid-Open No. 8-50206. Polymerization of disk-like liquid crystal molecule is described in Japanese Patent Application Laid-Open No. 8-27284 describes.

To fix the disk-like liquid crystal molecule by polymerization, it is necessary to bond a polymerizable group as a substituent to the disk-like core of the disk-like liquid crystal molecule. A compound in which the disk-like core and the polymerizable group are bonded through a linking group is preferred, and by this structure, the orientation state can be maintained even in the polymerization reaction. Examples of such compound include compounds described in Japanese Patent Application Laid-Open No. 2000-155216, paragraphs 0151 to 0168.

In hybrid orientation, the angle between the major axis (disc plane) of disk-like liquid crystal molecule and the plane of the polarizing film is increased or decreased with the increase in the distance from the plane of the polarizing film in the depth direction of the optically anisotropic layer. The angle is preferably decreased as the distance is increased. Further, possible variations of angles include continuous increase, continuous decrease, intermittent increase, intermittent decrease, variation including continuous increase and continuous decrease, and intermittent variation including increase and decrease. In the intermittent variation, there is a region in which the tilt angle does not vary in the thickness direction. Regarding this angle, there may be regions in which the angle does not vary, as long as the angle is totally increased or decreased. Further, the angle is preferably totally continuously varied.

The average direction of the major axis of the disk-like liquid crystal molecules on the polarizing film side can be generally controlled by selecting the material of disk-like liquid crystal molecule or that of the alignment film, or by selecting the rubbing method. The direction of the major axis of the disk-like liquid crystal molecule (disc plane) on the surface side (air side) can be generally controlled by selecting the material of disk-like liquid crystal molecule or that of the additive used together with the disk-like liquid crystal molecule. Examples of additives used together with the disk-like liquid crystal molecule include plasticizers, surfactants, polymerizable monomers and polymers. Further, the degree of variation in the oriented direction of the major axes can be controlled by selecting the kind of disk-like liquid crystal molecule and additives as described above.

(B-4) Other Components in Optically Anisotropic Layer

A plasticizer, a surfactant or a polymerizable monomer may be used together with the aforementioned liquid crystal molecule to improve the uniformity of the coating film, the strength of the film and the orientation property of the liquid crystal molecule etc. It is preferable that these components are compatible with the liquid crystal molecule so that they can play a part in the change in the tilt angle of the liquid crystal molecule, or do not hinder the orientation.

The polymerizable monomer may be a radically polymerizable or cationically polymerizable compound, and is preferably a radically polymerizable polyfunctional monomer, which is copolymerizable with the aforementioned liquid crystal compound containing a polymerizable group. Examples thereof include those described in Japanese Patent Application Laid-Open No. 2002-296423, paragraphs 0018 to 0020. The amount to be added of the compound is generally in the range of 1 to 50%, preferably in the range of 5 to 30% by mass based on the amount of the disk-like liquid crystal molecule.

The surfactant may be a conventionally known compound, but fluorine-containing compounds are particularly preferable. Specific examples thereof include compounds described in Japanese Patent Application Laid-Open No. 2001-330725, paragraphs 0028 to 0056.

It is preferable that the polymer used together with the disk-like liquid crystal molecule can play a part in the change in the tilt angle of the disk-like liquid crystal molecules. An example of such polymer is cellulose ester. Preferable examples of cellulose ester are described in Japanese Patent Application Laid-Open No. 2000-155216, paragraph 0178. To avoid hindering the orientation of the liquid crystal molecules, the amount to be added of the polymer is in the range of preferably 0.1 to 10% by mass, more preferably 0.1 to 8% by mass based on the amount of the liquid crystal molecule.

The transition temperature from the discotic nematic liquid crystal phase to the solid phase is preferably 70 to 300° C., more preferably 70 to 170° C.

(B-5) Formation of Optically Anisotropic Layer

The optically anisotropic layer can be formed by applying, to the alignment film, a coating solution containing liquid crystal molecules and if necessary, a polymerization initiator or optional components described below.

As the solvent used for preparing the coating solution, an organic solvent is preferably used. Examples of such organic solvent include amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone) and ethers (e.g., tetrahydrofuran, 1,2-dimethoxyethane). Of these, alkyl halides and ketones are preferred. Two or more organic solvents may be used together.

The coating solution can be applied by a known method (e.g., wire bar coating, extrusion coating, direct gravure coating, reverse gravure coating and die coating).

The optically anisotropic layer has a thickness of preferably 0.1 to 20 μm, more preferably 0.5 to 15 μm, and most preferably from 1 to 10 μm.

(B-6) Fixing of Orientation State of Liquid Crystal Molecule

The oriented liquid crystal molecule can be fixed with maintaining the orientation state. The fixation is preferably carried out by a polymerization reaction. Such polymerization reactions include a thermal polymerization reaction using a thermal polymerization initiator and a photopolymerization reaction using a photopolymerization initiator, and a photopolymerization reaction is preferred.

Examples of photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer and p-aminophenyl ketone (described in U.S. Pat. No. 3,549,367), acridine or phenazime compounds (described in Japanese Patent Application Laid-Open No. 60-105667 and U.S. Pat. No. 4,239,850) and oxadiazole compounds (described in U.S. Pat. No. 4,212,970).

The amount to be used of the photopolymerization initiator is in the range of preferably 0.01 to 20% by mass, more preferably 0.5 to 5% by mass based on the solid component in the coating solution.

Regarding photoirradiation for polymerizing liquid crystal molecules, ultraviolet light is preferably used.

The radiating energy is in the range of preferably 20 mJ/cm$^2$ to 50 J/cm$^2$, more preferably 20 to 5000 mJ/cm$^2$, further preferably 100 to 800 mJ/cm$^2$. To facilitate the photopolymerization reaction, photoirradiation may be carried out under heating.

A protective layer may be formed on the optically anisotropic layer.

This compensation film may also be combined with a polarizing layer. Specifically, a coating solution for an optically anisotropic layer as described above is applied to the surface of a polarizing film to form an optically anisotropic layer. Accordingly, a thin polarizing plate in which the stress (strain×cross-sectional area×elastic modulus) due to the dimensional change of the polarizing film is small can be produced without using any polymer film between the polarizing film and the optically anisotropic layer. When the polarizing plate of the present invention is incorporated into a large-sized liquid crystal display device, images having a high display quality can be displayed without causing problems such as light leakage.

As for the tilt angle between the polarizing layer and the compensation layer, stretching is preferably carried out so that the tilt angle is matched with the angle between the transmission axis of two polarizing plates adhered to both surfaces of a liquid crystal cell constituting a LCD and the longitudinal or transverse direction of the liquid crystal cell. The tilt angle is generally 45°, but recently, transmissive, reflective and semi-transmissive LCDs in which the tilt angle is not always 45° have been developed, and it is therefore desirable that the stretching direction can be optionally adjusted depending on the design of LCDs.

(B-7) Liquid Crystal Display Device

Liquid crystal modes in which such compensation film is used will be described.

(TN Mode Liquid Crystal Display Device)

This is most widely used in color TFT liquid crystal display devices and described in many publications. Regarding the orientation state of the liquid crystal cell in the TN mode displaying black, bar-like liquid crystal molecules are vertically aligned at the central portions of the cell while the molecules are horizontally aligned in the vicinity of the cell substrates.

(OCB Mode Liquid Crystal Display Device)

In this mode, the liquid crystal cell is in a bend orientation mode in which bar-like liquid crystal molecules in the upper part and in the lower part are substantially reversely (symmetrically) oriented. Liquid crystal display devices using such bend orientation mode liquid crystal cell are disclosed in U.S. Pat. Nos. 4,583,825 and 5,410,422. Since the bar-like liquid crystal molecules in the upper part and in the lower part are symmetrically oriented, the bend orientation mode liquid crystal cell has self-optical compensatory function. This mode is thus referred to as OCB (optically compensatory bend) liquid crystal mode.

Regarding the orientation state of the OCB mode liquid crystal cell displaying black, bar-like liquid crystal molecules are vertically aligned at the central portions of the cell while the molecules are horizontally aligned in the vicinity of the cell substrates as in the TN mode.

(VA Mode Liquid Crystal Display Device)

This mode is characterized by bar-like liquid crystal molecules being substantially vertically aligned when no voltage is applied. The VA mode liquid crystal cells include (1) VA mode liquid crystal cells in a narrow sense in which bar-like liquid crystal molecules are substantially vertically aligned when no voltage is applied while they are substantially horizontally aligned when voltage is applied (described in Japanese Patent Application Laid-Open No. 2-176625); (2) liquid crystal cells in a mode (MVA mode) in which VA mode is converted to a multi-domain mode for enlarging the viewing angle (described in SID97, Digest of tech. Papers (pre-prints), 28 (1997), 845); (3) liquid crystal cells in a mode (n-ASM mode) in which bar-like liquid crystal molecules are substantially vertically aligned when no voltage is applied while they are aligned being twisted in multi-domains when voltage is applied (described in Preprints of Symposium on Japanese Liquid Crystal Society, (1998), 58-59,); and (4) liquid crystal cells in SURVIVAL mode (published in LCD international 98).

(IPS Mode Liquid Crystal Display Device)

This mode is characterized in that bar-like liquid crystal molecules are substantially horizontally aligned in the plane when no voltage is applied, and that switching is performed by changing the alignment direction of the liquid crystal by applying or not applying voltage. Specifically, those described in Japanese Patent Application Laid-Open Nos. 2004-365941, 2004-12731, 2004-215620, 2002-221726, 2002-55341 and 2003-195333 may be used.

(Other Liquid Crystal Display Devices)

For ECB and STN modes, optical compensation can be achieved based on the same approach as described above.

(C) Application of Anti-Reflection Layer (Anti-Reflection Film)

An anti-reflection film is generally prepared by forming, on a transparent substrate, a low refractive index layer which also serves as an antifouling layer and at least one layer which has a higher refractive index than the low refractive index layer (i.e., high refractive index layer or middle refractive index layer).

Methods of forming a multi-layered film in which transparent thin films of inorganic compounds (metal oxides, etc.) of different refractive indexes are stacked include a chemical vapor deposition (CVD) method, a physical vapor deposition (PVD) method, and a method in which a metal compound such as metal alkoxide is subjected to a sol-gel method to be formed into a film of colloidal metal oxide particles, followed by post-treatment (ultraviolet radiation described in Japanese Patent Application Laid-Open No. 9-157855, or plasma treatment described in Japanese Patent Application Laid-Open No. 2002-327310) to form a thin film.

On the other hand, as anti-reflection films of high productivity, various anti-reflection films formed by stacking thin films of inorganic particles dispersed in a matrix are proposed.

An anti-reflection film having an anti-reflection layer to which an anti-glare property is imparted by forming fine irregularities on the uppermost layer of an anti-reflection film produced according to the aforementioned coating method may also be used.

Although any of the aforementioned methods can be applied to the cellulose acylate film of the present invention, the coating method (coating type) is particularly preferred.

(C-1) Layer Structure of Coating Type Anti-Reflection Film

An anti-reflection film having a layer structure in which at least a middle refractive index layer, a high refractive index layer and a low refractive index layer (the outermost layer) are formed on a substrate in that order is designed so that the film has refractive indexes satisfying the following relationship.

refractive index of high refractive index layer>refractive index of middle refractive index layer>refractive index of transparent substrate>refractive index of low refractive index layer A hard coat layer may be formed between the transparent substrate and the middle refractive index layer. The anti-reflection film may be composed of a middle refractive index hard coat layer, a high refractive index layer and a low refractive index layer.

Examples of such layer structure are described in Japanese Patent Application Laid-Open Nos. 8-122504, 8-110401, 10-300902, 2002-243906 and 2000-111706. In addition, those layers may have other function, and examples of such layers include a low refractive index layer having an antifouling property and a high refractive index layer having an antistatic property (e.g., Japanese Patent Application Laid-Open Nos. 10-206603, 2002-243906).

The anti-reflection film has a haze of preferably not more than 5%, more preferably not more than 3%. The strength of the film is preferably H or higher, more preferably 2H or higher, and most preferably 3H or higher as measured by the pencil hardness test in accordance with JIS K5400.

(C-2) High Refractive Index Layer and Middle Refractive Index Layer

The high refractive index layer of the anti-reflection film is a curable film containing at least inorganic compound ultrafine particles of high refractive index having an average particle size of 100 nm or less, and a matrix binder.

The inorganic compound ultrafine particles of high refractive index may be an inorganic compound having a refractive index of not less than 1.65, preferably not less than 1.9. Examples of inorganic compounds include oxides of Ti, Zn, Sb, Sn, Zr, Ce, Ta, La or In, and complex oxides containing these metal atoms.

Such ultrafine particles may be formed by, for example, treating the particle surface with a surface-treating agent (e.g., a silane coupling agent, Japanese Patent Application Laid-Open Nos. 11-295503, 11-153703 and 2000-9908, or an anionic compound or an organic metal coupling agent, Japanese Patent Application Laid-Open No. 2001-310432), forming a core-shell structure in which high refractive index particles constitute the core (Japanese Patent Application Laid-Open No. 2001-166104), or using a specific dispersant together (Japanese Patent Application Laid-Open No. 11-153703, U.S. Pat. No. 6,210,858 B1, Japanese Patent Application Laid-Open No. 2002-2776069).

The material which constitutes the matrix may be a conventionally known thermoplastic resin or curable resin film.

The material is preferably at least one composition selected from compositions containing a polyfunctional compound having at least two radically polymerizable groups and/or cationically polymerizable groups, organometallic compounds containing a hydrolyzable group and compositions containing a partial condensate thereof. Examples thereof include compounds described in Japanese Patent Application Laid-Open Nos. 2000-47004, 2001-315242, 2001-31871 and 2001-296401.

A curable film prepared using a colloidal metal oxide obtained from a hydrolyzed condensate of metal alkoxide and a metal alkoxide composition is also preferred. Such film is described, for example, in Japanese Patent Application Laid-Open No. 2001-293818.

The high refractive index layer has a refractive index of generally 1.70 to 2.20, and a thickness of preferably 5 nm to 10 μm, more preferably 10 nm to 1 μm.

The refractive index of the middle refractive index layer is adjusted so that it is between the refractive index of the low refractive index layer and the refractive index of the high refractive index layer. The middle refractive index layer has a refractive index of preferably 1.50 to 1.70.

(C-3) Low Refractive Index Layer

The low refractive index layer is stacked on the high refractive index layer. The low refractive index layer has a refractive index of 1.20 to 1.55, preferably 1.30 to 1.50.

This layer is preferably formed as an outermost layer having scratch resistance and an antifouling property. As a means for significantly improving the scratch resistance, imparting lubricity to the surface is effective, and conventionally known methods of forming a thin film layer by introducing silicone or fluorine can be applied.

The refractive index of the fluorine-containing compound is preferably 1.35 to 1.50, more preferably 1.36 to 1.47. As such fluorine-containing compound, compounds containing 35 to 80% by mass of fluorine atoms and a crosslinkable or polymerizable functional group are preferable.

Examples of such compound include those described in Japanese Patent Application Laid-Open No. 9-222503, paragraphs 0018 to 0026, Japanese Patent Application Laid-Open No. 11-38202, paragraphs 0019 to 0030, Japanese Patent Application Laid-Open No. 2001-40284, paragraphs 0027 to 0028 and Japanese Patent Application Laid-Open No. 2000-284102.

As the silicone compound, one having a polysiloxane structure and containing a curable functional group or a polymerizable functional group in the polymer chain, and which thus forms a crosslinked structure in the film is preferred. Examples thereof include reactive silicone (e.g., Silaplane (available from CHISSO CORPORATION) and polysiloxane containing a silanol group on both terminals (Japanese Patent Application Laid-Open No. 11-258403).

The crosslinking or polymerization reaction of such fluorine-containing polymer and/or siloxane polymer containing a crosslinkable or polymerizable group is preferably carried out by radiation of light or by heating simultaneously with or after applying a coating composition for forming an outermost layer, which contains a polymerization initiator and/or a sensitizer.

In addition, a sol-gel curable film in which an organometallic compound such as a silane coupling agent and a silane coupling agent containing a specific fluorine-containing hydrocarbon group undergo curing by a condensation reaction in the presence of a catalyst is also preferable. Examples thereof include silane compounds containing a polyfluoroalkyl group or partially-hydrolyzed condensates thereof (compounds described in Japanese Patent Application Laid-Open Nos. 58-142958, 58-147483, 58-147484, 9-157582, 11-106704) and silyl compounds containing a poly(perfluoroalkyl ether) group, which is a long-chain, fluorine-containing group (compounds described in Japanese Patent Application Laid-Open Nos. 2000-117902, 2001-48590, 2002-53804).

The low refractive index layer may contain, in addition to the above components, an additive such as a filler (e.g., low refractive index inorganic compounds having an average primary particle size of 1 to 150 nm such as silicon dioxide (silica) and fluorine-containing particles (magnesium fluoride, calcium fluoride, barium fluoride), organic fine particles described in Japanese Patent Application Laid-Open No. 11-3820, paragraphs [0020] to [0038]), a silane coupling agent, a lubricant and a surfactant.

When the low refractive index layer is positioned outermost, the low refractive index layer may be formed by a gas phase method (vacuum vapor deposition, sputtering, ion plating, or plasma CVD). The low refractive index layer is preferably formed by coating because inexpensive production is possible. The low refractive index layer has a film thickness of preferably 30 to 200 nm, more preferably 50 to 150 nm, and most preferably 60 to 120 nm.

(C-4) Hard Coat Layer

The hard coat layer is formed on the surface of a transparent support to impart physical strength to the anti-reflection film. Particularly, it is preferable that the hard coat layer is disposed between the transparent support and the high refractive index layer.

The hard coat layer is preferably formed by subjecting a photo-curable or thermally curable compound to a crosslinking reaction or polymerization reaction.

The curable functional group is preferably a photopolymerizable functional group, and the organometallic compound containing a hydrolyzable functional group is preferably an organic alkoxysilyl compound.

Specific examples of these compounds are the same as those listed in the case of the high refractive index layer. Specific examples of compositions constituting the hard coat layer include those described in Japanese Patent Application Laid-Open Nos. 2002-144913, 2000-9908 and WO 0/46617.

The high refractive index layer can also serve as a hard coat layer. Such layer may be formed by finely dispersing minute particles and incorporating them into the hard coat layer using the technique described in the section of the high refractive index layer. The hard coat layer can also serve as an anti-glare layer having anti-glare function (described later) by adding particles having an average particle size of 0.2 to 10 μm.

The film thickness of the hard coat layer can be suitably designed depending on the purpose of use. The hard coat layer has a film thickness of preferably 0.2 to 10 μm, more preferably 0.5 to 7 μm. The strength of the hard coat layer is preferably H or higher, more preferably 2H or higher, and most preferably 3H or higher as measured by the pencil hardness test in accordance with JIS K5400. Further, the smaller the abrasion of a test piece after a taber test in accordance with JIS K5400, the better.

(C-5) Forward Scattering Layer

A forward scattering layer is provided in order to impart an effect of improving viewing angles when the film is incorporated into a liquid crystal display device and the viewing angle is tilted up, down, to the right and the left. By dispersing fine particles of a different refractive index in the hard coat layer, the forward scattering layer can also have function of a hard coat layer.

Examples of such layer include those having a specified forward scattering coefficient (Japanese Patent Application Laid-Open No. 11-38208), those in which relative refractive indexes of transparent resin and fine particles are within specific ranges (Japanese Patent Application Laid-Open No. 2000-199809), and those having a specified haze value of not less than 40% (Japanese Patent Application Laid-Open No. 2002-107512).

(C-6) Other Layers

In addition to the aforementioned layers, the anti-reflection film may have a primer layer, an anti-static layer, an undercoat layer or a protective layer.

(C-7) Coating Method

Layers of the anti-reflection film may be formed by coating according to dip coat, air knife coat, curtain coat, roller coat, wire bar coat, gravure coat, micro gravure coat and extrusion coat (described in U.S. Pat. No. 2,681,294).

(C-8) Anti-Glare Function

The anti-reflection film may have anti-glare function for scattering light from the outside. The anti-glare function can be obtained by creating irregularities on the surface of the anti-reflection film. When the anti-reflection film has anti-glare function, the haze of the anti-reflection film is preferably 3 to 30%, more preferably 5 to 20%, and most preferably 7 to 20%.

As a method of forming irregularities on the surface of the anti-reflection film, any method capable of satisfactorily maintaining such irregular surface profile can be used. For example, a method in which fine particles are used for a low refractive index layer to form irregularities on the film surface (e.g., Japanese Patent Application Laid-Open No. 2000-271878), a method comprising adding a small amount (0.1 to 50% by mass) of relatively large particles (particle size: 0.05 to 2 μm) to the layer to be formed beneath the low refractive index layer (high refractive index layer, middle refractive index layer or hard coat layer) so as to form a film having an irregular surface, and then forming a low refractive index layer thereon with maintaining the surface shape (e.g., Japanese Patent Application Laid-Open Nos. 2000-281410, 2000-95893, 2001-100004 and 2001-281407); and a method comprising applying uppermost layer (antifouling layer) and then physically transferring irregularities to the surface thereof (e.g., embossing methods described in Japanese Patent Application Laid-Open Nos. 63-278839, 11-183710 and 2000-275401).

Measurement methods used in the present invention will be described in the following.

[1] Method of Measuring Re and Rth

Sample films are conditioned at a temperature of 5° C. and a humidity of 60% rh for at least 3 hours. Using an automatic birefringence analyzer (KOBRA-21ADH/PR, made by Oji Scientific Instruments), retardation values are measured at 25° C. and 60% rh at a wavelength of 550 nm in the direction perpendicular to the sample film surface, and the directions tilted ±40° relative to the normal of the film plane. The in-plane retardation (Re) is calculated from the value in the perpendicular direction, and the retardation in the thickness direction (Rth) is calculated from the measured values in the directions tilted ±40° from the perpendicular direction.

[2] Re, Rth, Fluctuation in Re and Rth in Length Direction and Width Direction (1) MD Sampling 100 pieces of 1 cm square are cut out at intervals of 0.5 m in the length direction of the film.

(2) TD Sampling 50 pieces of 1 cm square are cut out at regular intervals across the full width of the film.

(3) Measurement of Re and Rth

The sample films are conditioned at a temperature of 5° C. and a humidity of 60% rh for at least 3 hours. Using an automatic birefringence analyzer (KOBRA-21ADH/PR, made by Oji Scientific Instruments), retardation values are measured at 25° C. and 60% rh at a wavelength of 550 nm in a direction perpendicular to the sample film surface, and directions tilted ±40° relative to the normal of the film plane. The in-plane retardation (Re) is calculated from the value in the perpendicular direction, and the retardation in the thickens direction (Rth) is calculated from the measured values in the directions tilted ±40° from the perpendicular direction.

The average value of all sampling points is each defined as Re and Rth.

(4) Fluctuation in Re and Rth

The difference between the maximum value and the minimum value of 100 points in the machine direction and 50 points in the transverse direction is divided by each average value and shown in percentage to be defined as fluctuation in Re and fluctuation in Rth.

[3] Elongation at Break when Stretched by Tensilon

After pre-heating samples in an oven heated to Tg+10° C. of each sample for 1 minute using heated Tensilon manufactured by Toyo Seiki Co., Ltd., the samples are stretched until broken under conditions of a chuck distance of 100 mm and a tensile speed of 100 mm/minute to measure elongation at break.

[4] Degree of Substitution of Cellulose Acylate

The acyl substitution degree in cellulose acylate was measured using 13C-NMR according to the method described in Carbohydr. Res. 273 (1995) 83-91 (Tezuka et al.).

[5] DSC

Using DSC-50 made by Shimadzu Corporation, measurement was carried out at a temperature increase rate of 10° C./minute to calculate the calories J/g at the endothermic peak appearing immediately after the Tg, and at the same time, the Tg was measured.

[6] Haze

Haze was measured using Turbidimeter NDH-1001DP made by Nippon Denshoku Industries Co., Ltd.

[7] Yellowness Index (YI Value)

Yellowness (YI: yellowness index) was measured using Z-II OPTICAL SENSOR according to JIS K7105 6.3.

Yellowness of pellets was measured by a reflection method, and in the case of films, three stimulus values X, Y and Z were measured by a transmission method, with which YI values were calculated according to the following formula.

$$YI=\{(1.28X-1.06Z)/Y\}\times100$$

The YI value of each film calculated by the above formula was divided by the thickness of the film so as to be converted to the value per 1 mm, and the resulting values were compared.

[7] Molecular Weight

Film samples were dissolved in dichloromethane and the molecular weight was measured by GPC.

EXAMPLE

Cellulose Acylate Resin

Cellulose acylates having different acyl groups and different substitution degrees as shown in Table 1 of FIGS. 3A to 3E were prepared. Specifically, sulfuric acid (7.8 parts by weight based on 100 parts by weight of cellulose) was added as a catalyst and carboxylic acid which is the raw material of acyl substituent was added to conduct an acylation reaction at 40° C. Based on the kind and the amount of carboxylic acid, the kind and the degree of substitution with acyl group were controlled. After the acylation, the resultant was ripened at 40° C. The polymerization degree of the cellulose acylates thus obtained was determined by the following method and shown in the Table of FIGS. 3A to 3E.

(Method of Measuring Polymerization Degree)

Completely dried cellulose acylate was precisely weighed in an amount of about 0.2 g and dissolved in 100 ml of a mixed solvent of methylene chloride:ethanol 9:1 (mass ratio). The dropping time in seconds of the mixture was measured using an Ostwald viscometer at 25° C. and the polymerization degree was calculated according to the following formula.

$$\eta rel = T/T0$$

$$[\eta]=(1n\eta rel)/C$$

$$DP=[\eta]/Km$$

T: dropping time in seconds of measurement sample
T0: dropping time in seconds of solvent alone
C: concentration (g/l)
Km: $6\times10^{-4}$ The Tg of these resins was measured by the following method and shown in the Table of FIGS. 3A to 3E. For those to which a plasticizer was added, the value measured after adding the plasticizer is shown.

(Measurement of Tg)

20 mg of a sample is put in a DSC pan. The sample is heated from 30° C. to 250° C. at 10° C./minute under nitrogen stream (1st run), and then cooled to 30° C. at −10° C./minute. The sample is then heated again from 30° C. to 250° C. (2nd run). The temperature at which the baseline starts to deflect from the low temperature side in the 2nd run is defined as the glass transition temperature (Tg) and shown in the Table of FIGS. 3A to 3E. In addition, 0.05% by mass of silicon dioxide fine particles (AEROSIL R972V) was added to all samples.

[Melt Film Forming]

The aforementioned cellulose acylate resins were formed into cylindrical pellets 3 mm in diameter and 5 mm in length. Here, plasticizers were selected from those described later (shown in the Table of FIGS. 3A to 3E) and mixed with the pellet. The resultant was dried in a vacuum dryer at 110° C. and after controlling the moisture content to 0.1% or less, this was introduced to the hopper adjusted to Tg−10° C. In the Table of FIGS. 3A to 3E, TPP: triphenyl phosphate, BDP: biphenyldiphenyl phosphate, DOA: bis(2-ethylhexyl)adipate, PTP: 1,4-phenylene-tetraphenyl phosphoric ester.

The melting temperature was adjusted so that the melt viscosity was 1000 Pa·s, and the pellets were melted using the single screw extruder 11 set to 210° C. The melted material was then extruded on the cooling drum 14 adjusted to Tg−5° C. in the form of a sheet through the T-die 12 adjusted to the melting temperature and solidified with cooling to form a cellulose acylate film. At this stage, an electrostatic application method was used for each sample (10 kV wire being placed 10 cm from the landing point of the melt on the cooling drum 14). The solidified sheet was peeled off and taken up. Immediately before taking, both ends were trimmed (3% each of the total width) and subjected to thickness increasing processing (knurling) to achieve a width of 10 mm and a height of 50 μm. All samples were taken up at 30 m/minute in a width of 1.5 m and in a length of 3000 m.

[Stretching]

The cellulose acylate films produced by the aforementioned melt film forming were pre-heated with a pre-heating roll and then stretched at temperatures and length-width ratios described in the Table of FIGS. 3A to 3E. The stretching temperature is indicated in the table "relative to Tg", that is, indicated by how much higher or lower than the Tg of the resin of each Example and Comparative Example in a temperature indication of + or −. Longitudinal stretching and transverse stretching were carried out at the same temperatures which are described as "stretching temperature" in the Table.

In Examples 1-1 to 1-24 and Comparative Examples 1-1 and 1-2 shown in the Table of FIGS. 3A to 3E, qualities of stretched cellulose acylate films produced using each cellulose acylate film prepared under the film forming conditions described in the table were evaluated. The items of quality evaluation include Re, fluctuation thereof, Rth, fluctuation thereof, haze, YI value, film thickness and elongation at break upon stretching.

<<Quality Evaluation of Stretched Cellulose Acylate Film>>

The values in the Table of FIGS. 3A to 3E show film forming conditions, stretching conditions and accepted quality values of stretched cellulose acylate films, which are specifically as follows.

Screw compression ratio of extruder: 2.5 to 4.5
L/D of extruder: 20 to 50
Extrusion temperature: 190 to 240° C.
Pre-heating temperature in longitudinal stretching: Tg−40° C. to Tg+60° C.
Stretching ratio in longitudinal stretching: 1.01 to 3.0
Stretching ratio in transverse stretching: 1.0 to 2.5
DSC endothermic peak value: 4.0 J/g or less
Re: 0 to 500 nm
Coefficient of fluctuation in Re: 5% or less
Rth: 30 to 500 nm
Coefficient of fluctuation in Rth: 5% or less
Haze value: 2% or less
YI value: 10 or less
Film thickness: 30 to 300 μm
Elongation at break upon stretching: 50% (1.5 times the value before stretching) or more Referring to the Table of FIGS. 3A to 3E, in Examples 1-1 to 1-3, the extrusion temperature when producing a cellulose acylate film (unstretched) was set to 190° C. (lower limit), 220° C. and 240° C. (upper limit), which are within the range defined in the present invention. On the other hand, in Comparative Examples 1-1 and 1-2, the extrusion temperature was set to 185° C. (below the lower limit of the present invention) and 245° C. (above the upper limit of the present invention), which are outside the range defined in the present invention.

When stretched cellulose acylate films were produced using the unstretched cellulose acylate films produced under the extrusion temperature conditions of the aforementioned Examples and Comparative Examples, the elongation at break upon stretching was 70% (1.7 times the value before stretching) to 180% (2.8 times the value before stretching) in Examples 1-1 to 1-3, showing excellent stretcheability. The improvement in the stretcheability is also proved by the fact that substantially no minute crystal remain in the formed cellulose acylate films as evidenced by the DSC endothermic peak value of 4 J/g or less and the haze of 1.5% or less, both being the index of the amount of minute crystal remaining in the cellulose acylate film. Accordingly, the stretched cellulose acylate films exhibited good results of an Re of 40 to 50 (coefficient of fluctuation 2 to 4%) and an Rth of 240 to 260 (coefficient of fluctuation 2 to 4%). Further, because the extrusion temperature was 240° C. or lower, good results of YI values of 3 to 6 were obtained, which means that substantially no yellowing occurred.

On the other hand, in Comparative Example 1-1, the film had an elongation at break upon stretching of 47% (1.47 times the value before stretching) which fell short of the passing point of 50% (1.5 times the value before stretching), and was broken in the stretching step, and it was thus impossible to produce a stretched cellulose acylate film. This is consistent with the fact that the indexes of the amount of minute crystal remaining in the cellulose acylate films, i.e., the DSC endothermic peak value was 5.4 J/g, which is greater than 4 J/g, and the haze value was 2.3%, which is greater than 2%. In addition, in Comparative Example 1-2, since the melt extrusion temperature was 245° C., which is higher than 240° C., a good result of an elongation at break when stretched of 220% (2.2 times the value before stretching) was obtained, but the film had a high YI value of 11, which is above the passing point of 10, and the cellulose acylate film suffered from heavy yellowing.

Examples 1-4 to 1-8 were carried out at a constant extrusion temperature of 230° C. with change in the pre-heating temperature in longitudinal stretching within the range of Tg−40° C. to Tg+60° C. The stretched cellulose acylate film obtained by stretching the produced cellulose acylate film had appropriate levels of Re, coefficient of fluctuation in Re, Rth, coefficient of fluctuation in Rth, haze, YI value, film thickness and elongation at break upon stretching.

Examples 1-9 to 1-13 were carried out at a constant extrusion temperature of 230° C. with change in the screw compression ratio within the range defined in the present invention of 2.5 to 4.5. The stretched cellulose acylate film obtained by stretching the produced cellulose acylate film had acceptable quality levels of Re, coefficient of fluctuation in Re, Rth, coefficient of fluctuation in Rth, haze, YI value, film thickness and elongation at break upon stretching.

Examples 1-14 to 1-18 were carried out at a constant screw compression ratio of 3.5 and a constant L/D of 50, which is the upper limit thereof defined in the present invention, with change in the extrusion temperature within the range defined in the present invention of 190° C. to 240° C. The stretched cellulose acylate film obtained by stretching the produced cellulose acylate film had acceptable quality levels of Re, coefficient of fluctuation in Re, Rth, coefficient of fluctuation in Rth, haze, YI value, film thickness and elongation at break upon stretching.

Examples 1-19 to 1-24 were carried out with changing the glass transition temperature of the cellulose acylate resin within the range of 120° C. to 170° C. by changing the substitution degree and the molecular weight of cellulose acylate. The stretched cellulose acylate film obtained by stretching the produced cellulose acylate film had acceptable quality levels of Re, coefficient of fluctuation in Re, Rth, coefficient of fluctuation in Rth, haze, YI value, film thickness and elongation at break upon stretching.

Table of FIGS. 3A to 3E show only the cases in which the screw compression ratio satisfies the range of 2.5 to 4.5. When the screw compression ratio was greater than 4.5, molecules were broken and the molecular weight was thus decreased, which led to significant decrease in the mechanical strength of the produced cellulose acylate film. The subsequent stretching step was therefore not performed. When the screw compression ratio was smaller than 2.5, melting was insufficient and unmelted particles were generated, or bubbles were incorporated. The subsequent stretching step was therefore not performed.

Table of FIGS. 3A to 3E show only the cases in which the L/D satisfies the range of 20 to 50. When the L/D was less than 20, unmelted particles were generated and the subsequent stretching step was therefore not performed. When the L/D was greater than 50, molecules were broken and the molecular weight was thus decreased, which led to significant decrease in the mechanical strength of the produced cellulose acylate film. The subsequent stretching step was therefore not performed.

[Preparation of Polarizing Plate]

(1) Preparation of Polarizing Plate

Unstretched films were produced under the film forming conditions of Example 1 of Table 1 shown in FIGS. 3A to 3E, while the material of the film (substitution degree, polymerization degree, plasticizer) was changed as described in Table 2 shown in FIG. 4, and the following polarizing plates were prepared.

(1-1) Saponification of Cellulose Acylate Film

Unstretched cellulose acylate films were subjected to saponification by immersion described below. Those subjected to the saponification by coating described below also produced substantially the same results.

(i) Saponification by Coating

To 80 parts by mass of iso-propanol was added 20 parts by mass of water and KOH was dissolved therein up to 2.5N. The obtained mixture was adjusted to 60° C. to be used as a saponifying solution. The solution was applied to the cellulose acylate film at 60° C. in an amount of 10 g/m² to carry out saponification for 1 minute. Subsequently, hot water at 50° C. was sprayed using a spray at 10 L/m²·minute for 1 minute to wash the film.

(ii) Saponification by Immersion

A 2.5N NaOH aqueous solution was used as a saponifying solution. The solution was adjusted to 60° C., in which the cellulose acylate film was immersed for 2 minutes. The cellulose acylate film was then immersed in a 0.1N sulfuric acid aqueous solution for 30 seconds and passed through a wash bath.

(1-2) Preparation of Polarizing Layer

According to Example 1 of Japanese Patent Application Laid-Open No. 2001-141926, a film was stretched in the length direction with differentiating peripheral speeds of two pairs of nip rolls to prepare a polarizing layer having a thickness of 20 μm.

(1-3) Adhesion

The thus-obtained polarizing layer, the aforementioned saponified unstretched and stretched cellulose acylate films and saponified FUJITAC (unstretched triacetate film) were stacked using a 3% aqueous solution of PVA (PVA-117H available from Kuraray Co., Ltd.) as an adhesive in the stretching direction of the polarizing film and the film-forming flow direction (length direction) of the cellulose acylate film in the following combinations.

Polarizing plate A: unstretched cellulose acylate film/polarizing layer/FUJITAC

Polarizing plate B: unstretched cellulose acylate film/polarizing layer/unstretched cellulose acylate film (1-4) Color Change in Polarizing Plate The degree of color change in the thus-obtained polarizing plate was evaluated on a scale of one to ten (the larger the number, the greater the color change). All the polarizing plates produced according to the present invention exhibited good results.

(1-5) Evaluation of Humidity Curl

The humidity curl of the polarizing plate obtained as described above was measured by the aforementioned method. Those to which the present invention was applied exhibited excellent properties (low humidity curl) even after a polarizing plate was formed.

Polarizing plates in which layers are stacked so that the polarizing axis and the length direction of the cellulose acylate film cross at right angles or at 45 degrees were prepared and subjected to the same evaluation. Both produced similar results as in the aforementioned cases of parallel stacking.

(2) Preparation of Compensation Film and Liquid Crystal Display Device

The polarizing plate attached on the viewer side of a 22-inch liquid crystal display device using VA-type liquid crystal (made by Sharp Corporation) was removed, and when using the aforementioned retardation polarizing plate A or B instead, the polarizing plate was detached, and the plate was adhered on the viewer side using an adhesive so that the cellulose acylate film is on the side of the liquid crystal cell. The plate was positioned so that the transmission axis of the polarizing plate on the viewer side and the transmission axis of the polarizing plate on the backlight side are perpendicular to each other, and a liquid crystal display device was completed.

Since the polarizing plate according to the present invention has little humidity curl and is easy to adhere, little misalignment was found when adhered.

In addition, when the cellulose acylate film of the present invention was used instead of the cellulose acetate film of Example 1 of Japanese Patent Application Laid-Open No. 11-316378 to which a liquid crystal layer is applied, an excellent compensation film with little humidity curl was obtained.

When the cellulose acylate film of the present invention was used instead of the cellulose acetate film of Example 1 of Japanese Patent Application Laid-Open No. 7-333433 to which a liquid crystal layer is applied to prepare a compensation filter film, an excellent compensation film with little humidity curl was prepared.

The polarizing plate or the retardation polarizing of the present invention was applied to the liquid crystal display device described in Example 1 of Japanese Patent Application Laid-Open No. 10-48420, the optically anisotropic layer containing discotic liquid crystal molecules described in Example 1 of Japanese Patent Application Laid-Open No. 9-26572, an alignment film coated with polyvinyl alcohol, the 20 inch; VA-type liquid crystal display device described in FIGS. 2 to 9 of Japanese Patent Application Laid-Open No. 2000-154261, the 20 inch OCB-type liquid crystal display device described in FIGS. 10 to 15 of Japanese Patent Application Laid-Open No. 2000-154261 and the IPS-type liquid crystal display device described in FIG. 11 of Japanese Patent Application Laid-Open No. 2004-12731. As a result, excellent liquid crystal display devices with little humidity curl were prepared.

(3) Preparation of Low Reflection Film

Using the cellulose acylate film of the present invention, a low reflection film was prepared according to Example 47 of "Kokai Giho of Japan Institute of Invention & Innovation" (Kogi No. 2001-1745). The obtained film was subjected to humidity curl measurement described above. Those to which the present invention was applied produced good results as in the case of preparing polarizing plates. Further, the low reflection film of the present invention was applied to the outermost layer of the liquid crystal display device described in Example 1 of Japanese Patent Application Laid-Open No. 10-48420, the 20 inch VA-type liquid crystal display device described in FIGS. 2 to 9 of Japanese Patent Application Laid-Open No. 2000-154261, the 20 inch OCB-type liquid crystal display device described in FIGS. 10 to 15 of Japanese Patent Application Laid-Open No. 2000-154261 and the IPS-type liquid crystal display device described in FIG. 11 of Japanese Patent Application Laid-Open No. 2004-12731, and the devices were subjected to evaluation. As a result, excellent liquid crystal display devices were obtained.

The invention claimed is:

1. A method of producing a cellulose acylate film by melt film forming, comprising the steps of:
    extruding a cellulose acylate resin into a sheet at an extrusion temperature of 190° C. to 240° C. on a cooling support through a die, using an extruder which has a screw compression ratio of 2.5 to 4.5 and an L/D of 20 to 50; and
    solidifying the sheet by cooling,
    wherein the acylate group satisfies the following degree of substitution:
    $2.5 \leq A+B < 3.0$ and
    $1.25 \leq B < 3.0$,
    wherein A represents the degree of substitution with an acetyl group and B represents the total degree of substitution with a propionyl group, a butyryl group, a pentanoyl group and a hexanoyl group.

2. A cellulose acylate film having an elongation at break of 50% or more when the film is monoaxially stretched at a glass transition temperature Tg+10° C.
    wherein the acylate group satisfies the following degree of substitution:
    $2.5 \leq A+B < 3.0$ and
    $1.25 \leq B < 3.0$,
    wherein A represents the degree of substitution with an acetyl group and B represents the total degree of substitution with a propionyl group, a butyryl group, a pentanoyl group and a hexanoyl group.

3. The cellulose acylate film according to claim 2, wherein the film has a haze of 2.0% or less, an yellowness index (YI value) of 10 or less and an endothermic peak value of 4.0 J/g or less, which peak appears in the region of the glass transition temperature Tg or higher in DSC (differential scanning calorimetry).

4. The cellulose acylate film according to claim 2, wherein the film has a molecular weight of 20,000 to 100,000.

5. The cellulose acylate film according to claim 3, wherein the film has a molecular weight of 20,000 to 100,000.

6. A method of producing a stretched cellulose acylate film, comprising the step of:
    stretching an unstretched cellulose acylate film produced according to claim 1 in at least one of the longitudinal direction and the transverse direction of the film at 1 to 2.5 times.

7. A stretched cellulose acylate film obtained by stretching the unstretched cellulose acylate film according to claim 2 in at least one of the longitudinal direction and the transverse direction of the film at 1 to 2.5 times.

8. A stretched cellulose acylate film obtained by stretching the unstretched cellulose acylate film according to claim 5 in at least one of the longitudinal direction and the transverse direction of the film at 1 to 2.5 times.

9. The stretched cellulose acylate film according to claim 7, wherein the film has a thickness of 30 to 300 μm, an in-plane retardation (Re) of 0 to 500 nm and a retardation in the thickness direction (Rth) of 30 to 500 nm.

10. The stretched cellulose acylate film according to claim 8, wherein the film has a thickness of 30 to 300 μm, an in-plane retardation (Re) of 0 to 500 nm and a retardation in the thickness direction (Rth) of 30 to 500 nm.

11. The stretched cellulose acylate film according to claim 9, wherein the fluctuation in the Re and the fluctuation in the Rth are 5% or less in both the width direction and the length direction.

12. The stretched cellulose acylate film according to claim 10, wherein the fluctuation in the Re and the fluctuation in the Rth are 5% or less in both the width direction and the length direction.

13. A polarizing plate comprising at least one layer of the stretched cellulose acylate film according to claim 7 stacked.

14. A polarizing plate comprising at least one layer of the stretched cellulose acylate film according to claim 12 stacked.

15. A compensation film for a liquid crystal display panel, comprising the stretched cellulose acylate film according to claim 7 as a substrate of the compensation film.

16. A compensation film for a liquid crystal display panel, comprising the stretched cellulose acylate film according to claim 12 as a substrate of the compensation film.

17. An anti-reflection film comprising the stretched cellulose acylate film according to claim 7 as a substrate of the anti-reflection film.

18. An anti-reflection film comprising the stretched cellulose acylate film according to claim 12 as a substrate of the anti-reflection film.

* * * * *